(12) United States Patent
Kato et al.

(10) Patent No.: US 11,366,237 B2
(45) Date of Patent: Jun. 21, 2022

(54) MOBILE OBJECT, POSITIONING SYSTEM, POSITIONING PROGRAM, AND POSITIONING METHOD

(71) Applicant: Sony Corporation, Tokyo (JP)

(72) Inventors: Takaaki Kato, Tokyo (JP); Takahiro Tsujii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 205 days.

(21) Appl. No.: 16/768,083

(22) PCT Filed: Oct. 17, 2018

(86) PCT No.: PCT/JP2018/038670
§ 371 (c)(1),
(2) Date: May 29, 2020

(87) PCT Pub. No.: WO2019/111549
PCT Pub. Date: Jun. 13, 2019

(65) Prior Publication Data
US 2020/0309963 A1  Oct. 1, 2020

(30) Foreign Application Priority Data

Dec. 6, 2017 (JP) .............................. JP2017-234153

(51) Int. Cl.
*G01S 19/48* (2010.01)
*B60W 10/20* (2006.01)
(Continued)

(52) U.S. Cl.
CPC ............. *G01S 19/48* (2013.01); *B60W 10/20* (2013.01); *G01C 21/28* (2013.01); *G01S 19/06* (2013.01);
(Continued)

(58) Field of Classification Search
CPC .......... G01S 19/48; G01S 19/06; G01S 19/44; B60W 10/20; G01C 21/28; G01C 21/30
(Continued)

(56) References Cited

U.S. PATENT DOCUMENTS

2016/0327653 A1   11/2016  Humphreys et al.
2017/0285637 A1*  10/2017  Salinger ............... G05D 1/0027
2018/0268566 A1*   9/2018  Houts ....................... G06T 7/74

FOREIGN PATENT DOCUMENTS

EP       2 966 477 A1    1/2016
JP       07-286858 A    10/1995
(Continued)

OTHER PUBLICATIONS

Extended European Search Report dated Oct. 22, 2020 in European Patent Application No. 18886021.7, 11 pages.
(Continued)

*Primary Examiner* — Harry K Liu
(74) *Attorney, Agent, or Firm* — Xsensus LLP

(57) ABSTRACT

A mobile object according to the present technology includes a sensor, a map location estimation unit, a relative location estimation unit, a relative location estimation unit, a GNSS reception unit, and an absolute location estimation unit. The sensor acquires surrounding information. The map location estimation unit estimates a self location in a local map on the basis of an output of the sensor. The GNSS reception unit receives global navigation satellite system (GNSS) positioning information using a first carrier phase distance. The absolute location estimation unit estimates a self absolute location on the basis of the GNSS positioning information using the first carrier phase distance, GNSS positioning information using a second carrier phase distance, and a relative location, the GNSS positioning infor-
(Continued)

mation using the second carrier phase distance being received by another mobile object.

15 Claims, 14 Drawing Sheets

(51) Int. Cl.
  *G01C 21/28* (2006.01)
  *G01S 19/06* (2010.01)
  *G01S 19/44* (2010.01)
  *G05D 1/02* (2020.01)
(52) U.S. Cl.
  CPC ............ *G01S 19/44* (2013.01); *G05D 1/0214* (2013.01); *G05D 1/0223* (2013.01); *G05D 1/0278* (2013.01)
(58) Field of Classification Search
  USPC .................................................... 342/357.31
  See application file for complete search history.

(56) References Cited

FOREIGN PATENT DOCUMENTS

| JP | 2002-013940 A | 1/2002 | | |
|---|---|---|---|---|
| JP | 2005-031082 A | 2/2005 | | |
| JP | 2009-257763 A | 11/2009 | | |
| JP | 2009-270927 A | 11/2009 | | |
| JP | 2010-519550 A | 6/2010 | | |
| JP | 2012-211843 A | 11/2012 | | |
| JP | 2017-181109 A | 10/2017 | | |
| WO | WO-2015072032 A1 | * | 5/2015 | ............ B60W 30/14 |
| WO | 2017/057044 A1 | | 4/2017 | |
| WO | WO-2018060313 A1 | * | 4/2018 | ............. G01C 21/32 |

OTHER PUBLICATIONS

Eric Broshears, et al., "Ultra-wideband Radio Aided Carrier Phase Ambiguity Resolution in Real-Time Kinematic GPS Relative Positioning", Proceedings of the 26TH International Technical Meeting of the Ion Satellite Division, Sep. 16-20, 2013, XP056007469, pp. 1277-1284.
Eric Broshears, "Ultra-wideband Radio Aided Carrier Phase Ambiguity Resolution in Real-Time Kinematic GPS Relative Positioning", Aug. 3, 2013, XP055729400, 121 pages.
International Search Report and Written Opinion dated Jan. 15, 2019 for PCT/JP2018/038670 filed on Oct. 17, 2018, 9 pages including English Translation of the International Search Report.
Takashi, I., et al., "High precision vehicle locator," Mitsubishi Denki Giho, vol. 90, No. 3, Mar. 20, 2016, pp. 35-38.
Taro, S., et al. "Evaluation of Precise Point Positioning Using MADOCA-LEX via Quasi-Zenith Satellite System," Proceedings of the 2014 International Technical Meeting of The Institute of Navigation (ITM 2014), Jan. 27-29, 2014, pp. 460-470.

* cited by examiner

MOBILE OBJECT, POSITIONING SYSTEM, POSITIONING PROGRAM, AND POSITIONING METHOD

CROSS-REFERENCE TO RELATED APPLICATIONS

The present application is based on PCT filing PCT/JP2018/038670, filed Oct. 17, 2018, which claims priority to JP 2017-234153, filed Dec. 06, 2017, the entire contents of each are incorporated herein by reference.

TECHNICAL FIELD

The present technology relates to a mobile object, a positioning system, a positioning program, and a positioning method, which estimate a self location by using radio waves received from artificial satellites.

BACKGROUND ART

Mobile objects such as cars can measure self locations by a global navigation satellite system (GNSS). In the field of autonomous driving and the like, the accuracy in self location is important, and the GNSS is further expected to improve measurement accuracy. For example, Patent Literatures 1 and 2 disclose the technologies related to self location estimation for cars and the like.

A self location measuring method that has recently attracted attention is a "high-accuracy GNSS using a carrier phase distance". This technology measures a phase of carrier waves received from a satellite and transmits carrier phase data from a reference station to a mobile station. The mobile station identifies a self location using the phase measured by itself and the carrier phase data transmitted from the reference station.

RTK-GPS, which is a typical technique using a carrier phase, allows errors such as disturbance due to the ionosphere and a clock offset, which are caused in normal GPS, to be cancelled by using a double difference of measurement results and allows high-accuracy positioning at several-mm accuracy to be performed outside. In addition, as another technique, there is a technique (PPP-RTK) of estimating in advance the disturbance due to the ionosphere and the clock offset to thus perform high-accuracy GNSS positioning without using a base station.

CITATION LIST

Patent Literature

Patent Literature 1: Japanese Patent Application Laid-open No. 2002-013940
Patent Literature 2: Japanese Patent Application Laid-open No. 2005-031082

DISCLOSURE OF INVENTION

Technical Problem

In the above-mentioned GNSS using a carrier phase, it is necessary to estimate an integer bias as initialization. If the receivers of the reference station and the mobile station each receive carrier waves, the phase thereof can be measured, but a wavenumber (integer bias) between the receiver and the satellite is unknown. Solving the integer bias allows measurement of a self location.

There are two methods to be used for solving the integer bias. One of the methods is a method of using a reference station, the location of which is known, as an anchor. However, this method has difficulty in preparing a sufficient number of reference stations. The PPP-RTK exists as a technique of solving this problem, but it also needs a plurality of movement observations in order to stabilize estimation and needs time by minutes. This estimation is a necessary process each time the location is missed during driving in a tunnel, for example.

In order to accelerate the estimation, there is a method of performing observation with a plurality of receivers being in rigid fixation. In this method, however, the plurality of receivers needs to be separated from one another at a sufficient distance, and there is a physical restriction by a device equipped with the receiver.

In view of the circumstances as described above, it is an object of the present technology to provide a mobile object, a positioning system, a positioning program, and a positioning method, which are capable of performing a high-accuracy self location estimation at high speed by using GNSS including a carrier phase.

Solution to Problem

In order to achieve the object described above, a mobile object according to an embodiment of the present technology includes a sensor, a map location estimation unit, a relative location estimation unit, a relative location estimation unit, a GNSS reception unit, and an absolute location estimation unit.

The sensor acquires surrounding information.

The map location estimation unit estimates a self location in a local map on the basis of an output of the sensor.

The GNSS reception unit receives global navigation satellite system (GNSS) positioning information using a first carrier phase distance.

The absolute location estimation unit estimates a self absolute location on the basis of the GNSS positioning information using the first carrier phase distance, GNSS positioning information using a second carrier phase distance, and the relative location, the GNSS positioning information using the second carrier phase distance being received by the other mobile object.

According to this configuration, the mobile object can estimate a relative location with respect to the other mobile object by sharing the local map with the other mobile object and can estimate a self absolute location by using the relative locations, GNSS positioning information using a carrier phase distance (GNSS positioning information using first carrier phase distance), which is received by the GNSS reception unit, and GNSS positioning information using a carrier phase distance (GNSS positioning information using second carrier phase distance), which is received by the other mobile object. This allows high-accuracy self location estimation to be performed at high speed when the GNSS positioning using carrier phase distances is performed.

The sensor may be an image sensor capable of capturing an image.

The map location estimation unit may extract a feature point in a first captured image captured by the image sensor, and estimate the self location in the local map from a landmark included in the local map and a change of the feature point due to movement of the mobile object.

The mobile object is capable of estimating the self location in the local map on the basis of a first captured image captured by an image sensor.

The relative location estimation unit estimates the relative location from the self location in the local map, the self location being estimated by the map location estimation unit, and a location of the other mobile object in the local map, the location of the other mobile object being received from the other mobile object.

The mobile object is capable of receiving the location of the other mobile object in the local map from the other mobile object and estimating relative locations of the mobile object and the other mobile object.

The map location estimation unit may receive a second captured image from the other mobile object, the second captured image being captured by an image sensor of the other mobile object, and may further estimate a location of the other mobile object in the local map.

The relative location estimation unit may estimate the relative location from the self location in the local map, the self location being estimated by the map location estimation unit, and the location of the other mobile object in the local map.

The mobile object may receive a second captured image captured by the other mobile object from the other mobile object and estimate the location of the other mobile object in the local map, instead of receiving the location of the other mobile object in the local map from the other mobile object.

The mobile object may further include a map description unit that creates the landmark by using a time change of the feature point and the self location in the local map, the self location being estimated by the map location estimation unit.

This configuration makes it possible to increase the number of landmarks to be used for estimating a map location by the mobile object continuing the GNSS positioning using a carrier phase distance.

The first captured image and the second captured image may be images captured at the same time.

The first captured image and the second captured image may be images captured at different times or may be images captured at the same time as long as the images include the same landmark.

The mobile object may further include an initial absolute location estimation unit that selects a potential location on the basis of general solitary positioning without using a distance, the potential location being calculated from the GNSS positioning information using the first carrier phase distance.

The GNSS reception unit is capable of performing solitary positioning (general GNSS positioning) in addition to the GNSS positioning using a carrier phase distance and capable of estimating a rough location of the mobile object from a result of the positioning. The initial absolute location estimation unit is capable of narrowing potential locations by the GNSS positioning using a carrier phase distance on the basis of the rough location of the mobile object.

The mobile object may further include a communication unit that receives the GNSS positioning information using the second carrier phase distance, and the communication unit may receive the GNSS positioning information using the second carrier phase distance from the other mobile object.

The mobile object may directly receive the GNSS positioning information using the second carrier phase distance, which is received by the other mobile object, from the other mobile object through vehicle-to-vehicle communication.

The mobile object may further include a communication unit that receives the GNSS positioning information using the second carrier phase distance, and the communication unit may receive the GNSS positioning information using the second carrier phase distance from a server.

The other mobile object is capable of transmitting the received GNSS positioning information using the second carrier phase distance to the server, and the mobile object may receive the GNSS positioning information using the second carrier phase distance from the server.

In order to achieve the object described above, a positioning system according to an embodiment of the present technology include a first mobile object and a second mobile object.

The first mobile object includes a first sensor that acquires surrounding information, a first map location estimation unit that estimates a self location in a local map on the basis of an output of the first sensor, a relative location estimation unit that estimates, from a location of a second mobile object in the local map and the self location in the local map, a self relative location with respect to the second mobile object, a first GNSS reception unit that receives global navigation satellite system (GNSS) positioning information using a first carrier phase distance, a first communication unit that receives GNSS positioning information using a second carrier phase distance that is received by the second mobile object, and an absolute location estimation unit that estimates a self absolute location on the basis of the GNSS positioning information using the first carrier phase distance, the GNSS positioning information using the second carrier phase distance, and the relative location.

The second mobile object includes a second sensor that acquires surrounding information, a second GNSS reception unit that receives the GNSS positioning information using the second carrier phase distance, and a second communication unit that transmits the GNSS positioning information using the second carrier phase distance to the first communication unit.

The first mobile object may further includes a first communication unit that receives the GNSS positioning information using the second carrier phase distance, and the second mobile object may further includes a second communication unit that transmits the GNSS positioning information using the second carrier phase distance to the first communication unit.

The second mobile object may further include a second map location estimation unit that estimates the location of the second mobile object in the local map on the basis of an output of the second sensor.

In order to achieve the object described above, a positioning system according to an embodiment of the present technology include a first mobile object, a second mobile object, and a server.

The first mobile object includes a first sensor that acquires surrounding information, and a first GNSS reception unit that receives global navigation satellite system (GNSS) positioning information using a first carrier phase distance.

The second mobile object includes a second sensor that acquires surrounding information, and a second GNSS reception unit that receives GNSS positioning information using a second carrier phase distance.

The server includes a map location estimation unit that estimates a location of the first mobile object in a local map on the basis of an output of the first sensor and estimates a location of the second mobile object in the local map on the basis of an output of the second sensor, a relative location estimation unit that estimates, from the location of the first mobile object in the local map and the location of the second mobile object in the local map, a relative location of the first mobile object with respect to the second mobile object, and an absolute location estimation unit that estimates an absolute location of the first mobile object on the basis of the GNSS positioning information using the first carrier phase distance, the GNSS positioning information using the second carrier phase distance, and the relative location.

In order to achieve the object described above, a positioning program according to an embodiment of the present technology causes an information processing apparatus to function as a map location estimation unit, a relative location estimation unit, and an absolute location estimation unit.

The map location estimation unit estimates a self location in a local map on the basis of an output of a sensor that acquires surrounding information.

The relative location estimation unit estimates, from a location of another mobile object in the local map and the self location in the local map, a self relative location with respect to the other mobile object.

The absolute location estimation unit estimates a self absolute location on the basis of global navigation satellite system (GNSS) positioning information using a first carrier phase distance, GNSS positioning information using a second carrier phase distance, and the relative location, the GNSS positioning information using the first carrier phase distance being received by a GNSS reception unit, the GNSS positioning information using the second carrier phase distance being received by the other mobile object.

In order to achieve the object described above, a positioning method according to an embodiment of the present technology includes: estimating, by a map location estimation unit, a self location in a local map on the basis of an output of a sensor that acquires surrounding information; estimating, by a relative location estimation unit, from a location of another mobile object in the local map and the self location in the local map, a self relative location with respect to the other mobile object; and estimating, by an absolute location estimation unit, a self absolute location on the basis of global navigation satellite system (GNSS) positioning information using a first carrier phase distance, GNSS positioning information using a second carrier phase distance, and the relative location, the GNSS positioning information using the first carrier phase distance being received by a GNSS reception unit, the GNSS positioning information using the second carrier phase distance being received by the other mobile object.

Advantageous Effects of Invention

As described above, according to the present technology, it is possible to provide a mobile object, a positioning system, a positioning program, and a positioning method, which are capable of performing a high-accuracy self location estimation at high speed by using GNSS positioning including a carrier phase. Note that the effects described herein are not necessarily limited and any one of the effects described in this disclosure may be produced.

MODE(S) FOR CARRYING OUT THE INVENTION

A positioning system according to this embodiment will be described.

[Regarding RTK-GPS]

Description will be given on a real time kinematic-global positioning system (RTK-GPS) that is an example of a GNSS using a carrier phase.

Figure 1:
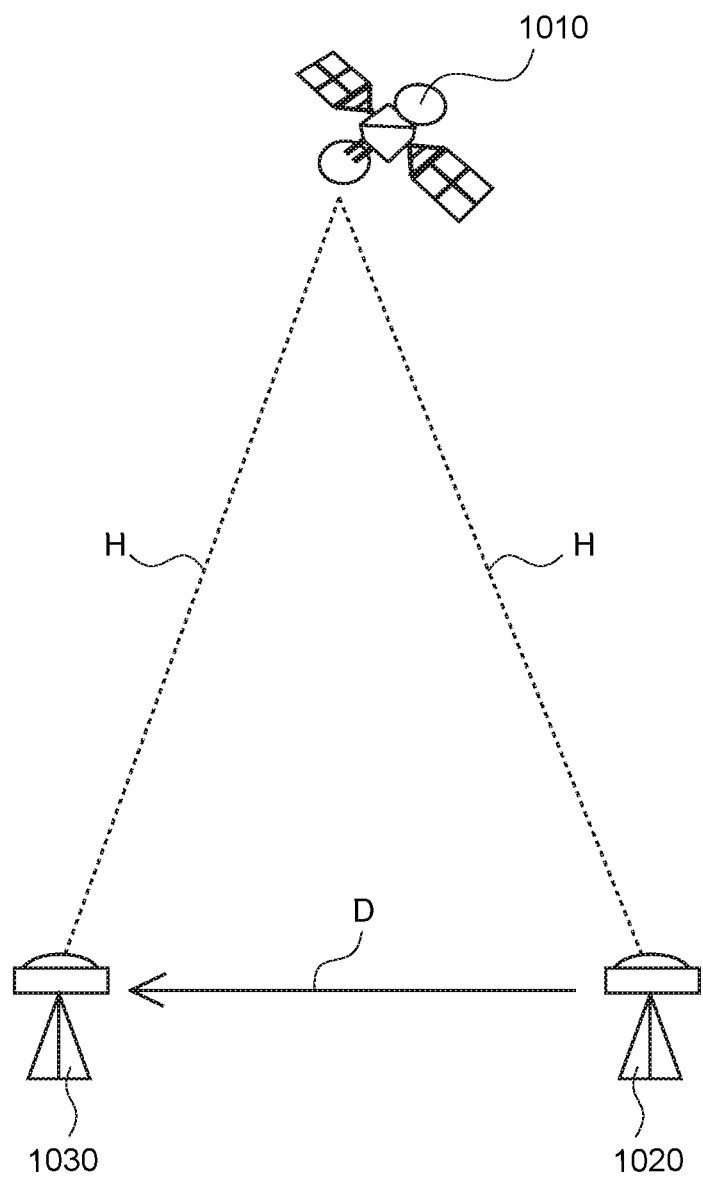
FIG. 1 is a schematic diagram showing the general outline of GNSS using a carrier phase distance.

FIG. 1 is a schematic diagram of a general RTK-GPS. The RTK-GPS includes a satellite 1010, a reference station 1020, and a mobile station 1030. The reference station 1020 is fixed to a specific ground-based location, and the mobile station 1030 is a mobile object such as a car.

As shown in the figure, the reference station 1020 and the mobile station 1030 each receive carrier waves H from the satellite 1010 and measure a phase. The reference station 1020 transmits carrier phase data D, which includes a self location and a result of the phase measurement to the mobile station 1030 by wireless communication or the like. The mobile station 1030 can measure a self location from a result of its own phase measurement and the received carrier phase data.

Use of the difference in carrier phase (single difference) of the reference station 1020 and the mobile station 1030 with respect to the single satellite 1010 cancels out a clock error of the satellite 1010. In addition, use of the difference (double difference) between two satellites 1010 having different single differences of the reference station 1020 and the mobile station 1030 cancels out delays due to the troposphere, the ionosphere, and the like, in addition to the clock error. This allows a location to be highly accurately measured outdoors at several-mm accuracy.

Figure 2:
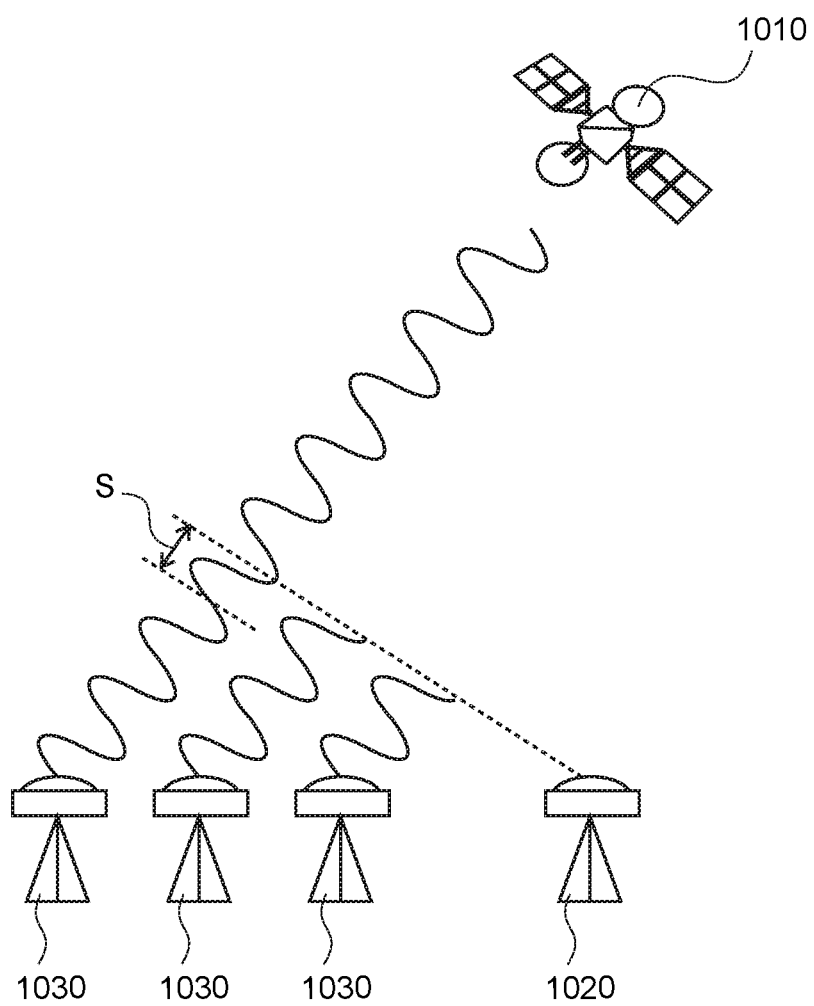
FIG. 2 is a schematic diagram showing a phase difference of carrier waves in the GNSS using the carrier phase distance.

Specifically, in order to determine the location of the mobile station 1030, it is necessary to estimate an integer bias. FIG. 2 is a schematic diagram showing a phase difference of carrier waves. As shown in the figure, in a case where a phase difference S between the reference station 1020 and the mobile station 1030 is measured, the mobile station 1030 is present at a location at which the phase difference with respect to the reference station 1020 is S, whereas a wavenumber (integer bias) between the mobile station 1030 and the satellite 1010 is unknown. For that reason, the mobile station 1030 is present at any of potential locations at which the phase difference with respect to the reference station 1020 is S, as shown in FIG. 2.

Figure 3:
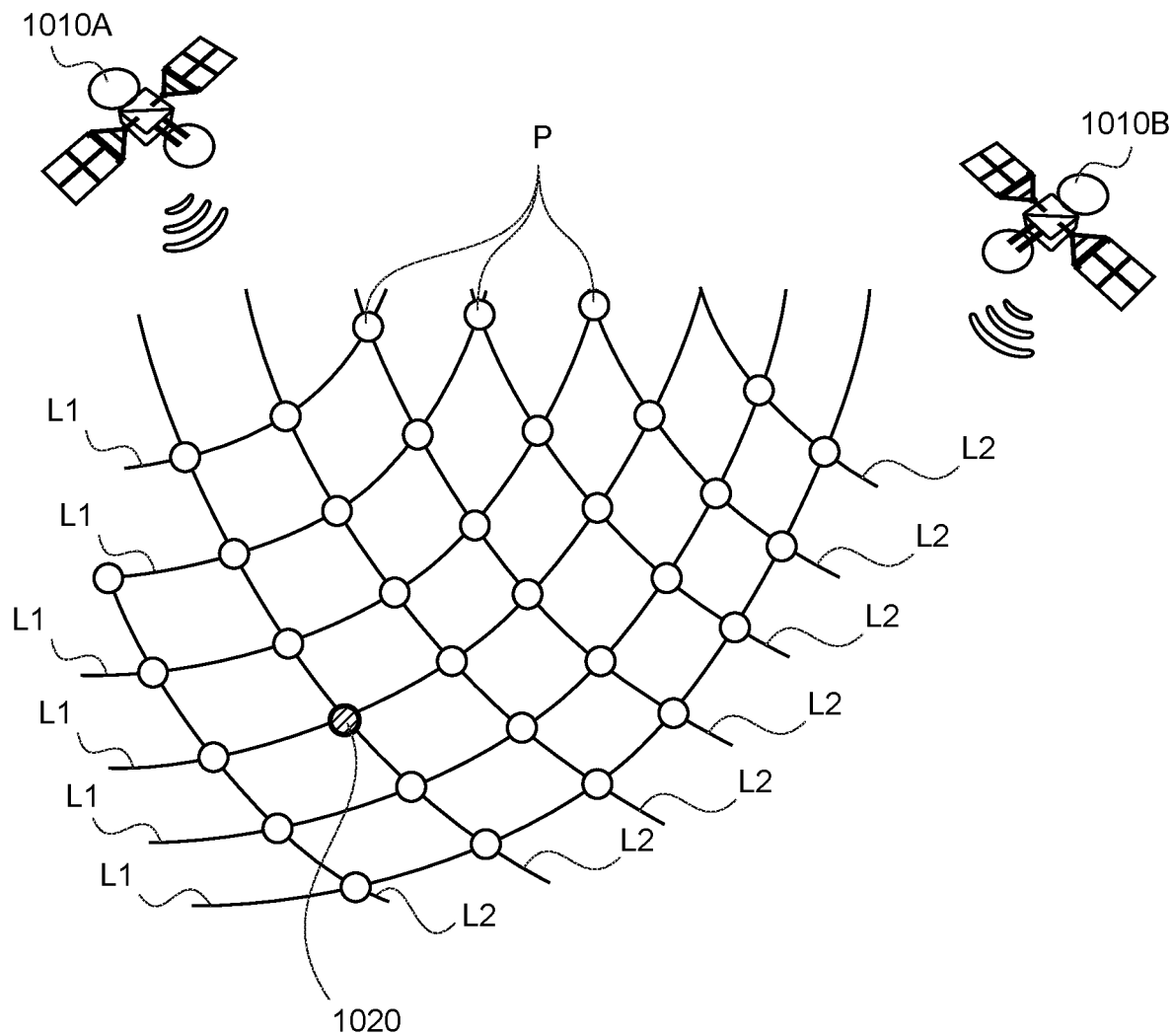
FIG. 3 is a schematic diagram showing potential locations of a mobile station by the GNSS using the carrier phase distance.

FIG. 3 is a schematic diagram showing potential locations P at which the phase difference with respect to the reference station 1020 is S, in which a carrier wave line transmitted from a satellite 1010A is represented by a line L1, and carrier waves transmitted from a satellite 1010B are represented by a line L2. An interval between the lines L1 and an interval between the lines L2 (wavelength of carrier waves) are 19 cm, for example.

In a case where the reference station 1020 is at a location of an intersection between the line L1 and the line L2 and the phase difference in carrier waves between the reference station 1020 and the mobile station 1030 is zero, the mobile station 1030 is present at a location at which the phase difference is zero with respect to the reference station 1020, that is, the intersection between the line L1 and the line L2 is a potential location P. If the location of the reference station 1020 is known, a potential location P at which the mobile station 1030 is present can be identified by observation of a change in location with time.

In such a manner, in the general RTK-GPS, the mobile station can estimate its own location by acquiring the carrier phase data including the location of the reference station and the result of the phase measurement from a reference station, the location of which is known. However, in a case where the RTK-GPS is used over a wide area, it is difficult to install the reference station. In addition, for another technology, GNSS positioning using a carrier phase without a base station by calculating an impact from the ionosphere and the like in advance is also present, but both of them need estimation by minutes in order to acquire an integer value bias.

The positioning system according to this embodiment allows a self location estimation by highly accurate GNSS positioning using a carrier phase distance at high speed.

[Regarding Positioning System]

Figure 4:
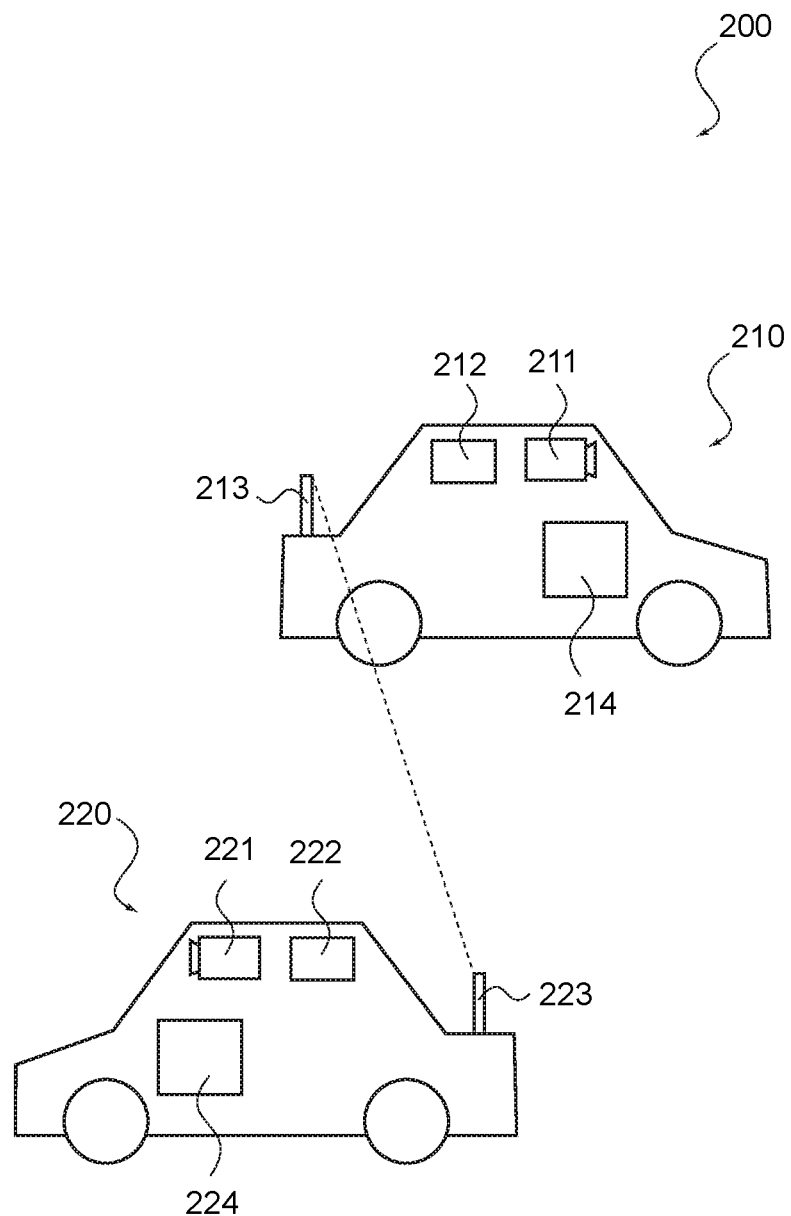
FIG. 4 is a schematic diagram showing a configuration of a positioning system according to this embodiment.

FIG. 4 is a schematic diagram showing a configuration of a positioning system 200 according to this embodiment. As shown in the figure, the positioning system 200 includes a first mobile object 210 and a second mobile object 220. Note that the positioning system 200 may include a larger number of mobile objects.

The first mobile object 210 and the second mobile object 220 only need to be movable and are typically cars. In addition, the first mobile object 210 and the second mobile object 220 may be, for example, drones, agricultural machines, or electronic apparatuses.

The first mobile object 210 includes a first image sensor 211, a first GNSS reception unit 212, a first communication unit 213, and a first information processing unit 214. In addition, the second mobile object 220 includes a second image sensor 221, a second GNSS reception unit 222, a second communication unit 223, and a second information processing unit 224.

The first image sensor 211 is a sensor capable of capturing an image of the surrounding, typically, the front of the first mobile object 210. The first image sensor 211 outputs the captured image (hereinafter, first captured image) to the first information processing unit 214. The first GNSS reception unit 212 receives GNSS positioning information using a carrier phase distance and solitary positioning information from a satellite and outputs them to the first information processing unit 214.

The first communication unit 213 performs communication with the second communication unit 223. The communication method is not particularly limited, but it is, for example, wireless communication. The first information processing unit 214 is connected to the first image sensor 211, the first GNSS reception unit 212, and the first communication unit 213 and executes information processing, which will be described later, on the basis of those outputs.

The second image sensor 221 is a sensor capable of capturing an image of the surrounding, typically, the front of the second mobile object 220. The second image sensor 221 outputs the captured image (hereinafter, second captured image) to the second information processing unit 224. The second GNSS reception unit 222 receives GNSS positioning information using a carrier phase distance and solitary positioning information from a satellite and outputs them to the second information processing unit 224.

The second communication unit 223 performs communication with the first communication unit 213. The second information processing unit 214 is connected to the second image sensor 221, the second GNSS reception unit 222, and the second communication unit 223 and executes information processing information processing to be described on the basis of those outputs.

Note that the first communication unit 213 and the second communication unit 223 may perform direct communication with each other as shown in FIG. 4 or may perform communication via equipment or facilities that mediate communication.

[Specific Example of Mobile Object]

Figure 5:
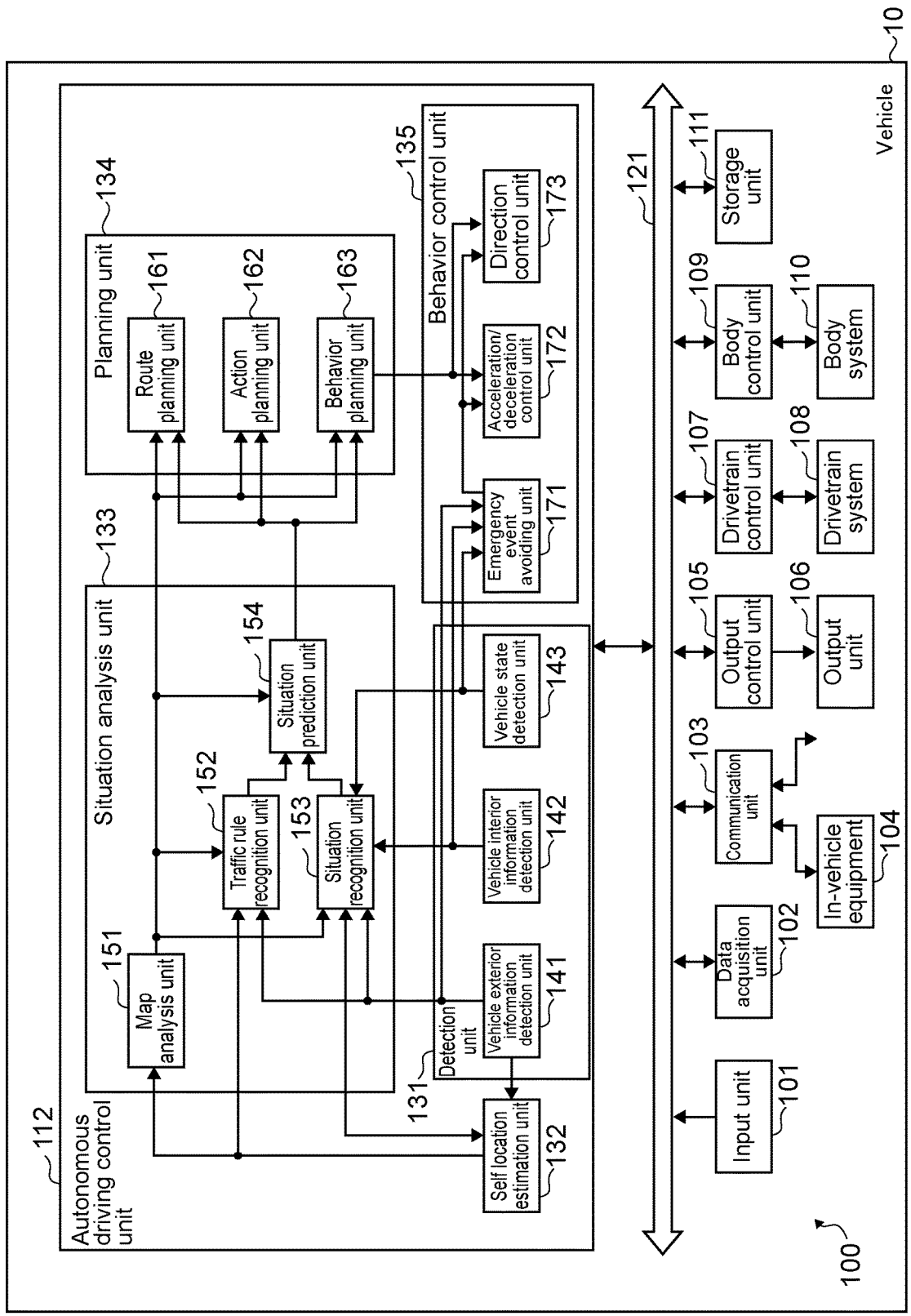
FIG. 5 is a block diagram showing a schematically functional configuration example of a vehicle control system that is an example of a mobile object control system to which the present technology can be applied.

The first mobile object 210 and the second mobile object 220 can be assumed to include a mobile object control system. FIG. 5 is a block diagram showing a schematically functional configuration example of a vehicle control system 100 that is an example of a mobile object control system to which the present technology can be applied.

Note that, hereinafter, a vehicle including the vehicle control system 100 is referred to as an own car or an own vehicle in the case of distinguishing the vehicle from other vehicles.

The vehicle control system 100 includes an input unit 101, a data acquisition unit 102, a communication unit 103, in-vehicle equipment 104, an output control unit 105, an output unit 106, a drivetrain control unit 107, a drivetrain system 108, a body control unit 109, a body system 110, a storage unit 111, and an autonomous driving control unit 112. The input unit 101, the data acquisition unit 102, the communication unit 103, the output control unit 105, the drivetrain control unit 107, the body control unit 109, the storage unit 111, and the autonomous driving control unit 112 are connected to each other via a communication network 121. For example, the communication network 121 includes a bus or a vehicle-mounted communication network compliant with any standard such as a controller area network (CAN), a local interconnect network (LIN), a local area network (LAN), FlexRay (registered trademark), or the like. Note that, sometimes the units of the vehicle control system 100 may be directly connected to each other without using the communication network 121.

Note that, hereinafter, description of the communication network 121 will be omitted in the case where the units of the vehicle control system 100 communicate with each other via the communication network 121. For example, simple description indicating that the input unit 101 and the autonomous driving control unit 112 communicate with each other will be given, in the case where the input unit 101 and the autonomous driving control unit 112 communicate with each other via the communication network 121.

The input unit 101 includes an apparatus used by a passenger to input various kinds of data, instructions, or the like. For example, the input unit 101 includes an operation device such as a touchscreen, a button, a microphone, a switch, or a lever, an operation device capable of inputting information by sound, gesture, or the like that is different from manual operation, or the like. Alternatively, for example, the input unit 101 may be external connection equipment such as a remote control apparatus using infrared or another radio wave, or mobile equipment or wearable equipment compatible with operation of the vehicle control system 100. The input unit 101 generates an input signal on the basis of data, an instruction, or the like input by a passenger, and supplies the generated input signal to the respective units of the vehicle control system 100.

The data acquisition unit 102 includes various kinds of sensors or the like for acquiring data to be used in processes performed by the vehicle control system 100, and supplies the acquired data to the respective units of the vehicle control system 100.

For example, the data acquisition unit 102 includes various kinds of sensors for detecting a state or the like of the own car. Specifically, for example, the data acquisition unit 102 includes a gyro sensor, an acceleration sensor, an inertial measurement unit (IMU), and sensors or the like for detecting an amount of operation of an accelerator pedal, an amount of operation of a brake pedal, an steering angle of a steering wheel, the number of revolutions of an engine, the number of revolutions of a motor, rotational speeds of wheels, and the like.

In addition, for example, the data acquisition unit 102 includes various kinds of sensors for detecting information regarding the outside of the own car. Specifically, for example, the data acquisition unit 102 includes an imaging apparatus such as a time-of-flight (ToF) camera, a stereo camera, a monocular camera, an infrared camera, or another camera. In addition, for example, the data acquisition unit 102 includes an environment sensor for detecting weather, a meteorological phenomenon, or the like, and a surrounding information detection sensor for detecting objects around the own car. For example, the environment sensor includes a raindrop sensor, a fog sensor, a sunshine sensor, a snow sensor, or the like. The surrounding information detection sensor includes an ultrasonic sensor, a radar, a LiDAR (Light Detection and Ranging, Laser Imaging Detection and Ranging) sensor, a sonar, or the like.

Moreover, for example, the data acquisition unit 102 includes various kinds of sensors for detecting a current location of the own car. Specifically, for example, the data acquisition unit 102 includes a global navigation satellite system (GNSS) receiver or the like. The GNSS receiver receives GNSS signals from a GNSS satellite.

In addition, for example, the data acquisition unit 102 includes various kinds of sensors for detecting information regarding the inside of the own car. Specifically, for example, the data acquisition unit 102 includes an imaging apparatus that captures an image of a driver, a biological sensor that detects biological information of the driver, a microphone that collects sound within the interior of the vehicle, or the like. The biological sensor is, for example, disposed on a seat surface, the steering wheel, or the like, and detects biological information of a passenger sitting in a seat or the driver holding the steering wheel.

The communication unit 103 communicates with the in-vehicle equipment 104, various kinds of vehicle exterior equipment, a server, a reference station, or the like, transmits data supplied by the respective units of the vehicle control system 100, and supplies the received data to the respective units of the vehicle control system 100. Note that, a communication protocol supported by the communication unit 103 is not specifically limited. It is possible for the communication unit 103 to support a plurality of types of communication protocols.

For example, the communication unit 103 establishes wireless connection with the in-vehicle equipment 104 by using a wireless LAN, Bluetooth (registered trademark), near-field communication (NFC), wireless USB (WUSB), or the like. In addition, for example, the communication unit 103 establishes wired connection with the in-vehicle equipment 104 by using Universal Serial Bus (USB), High-Definition Multimedia Interface (HDMI) (registered trademark), Mobile High-Definition Link (MHL), or the like via a connection terminal (and a cable if necessary) (not illustrated).

Moreover, for example, the communication unit 103 communicates with equipment (for example, an application server or a control server) present on an external network (for example, the Internet, a cloud network, or a company-specific network) via a reference station or an access point. Moreover, for example, the communication unit 103 communicates with a terminal (for example, a terminal of a pedestrian or a store, or a machine-type communication (MTC) terminal) present in the vicinity of the own car by using a peer-to-peer (P2P) technology. In addition, for example, the communication unit 103 carries out V2X communication such as vehicle-to-vehicle communication, vehicle-to-infrastructure communication, vehicle-to-home communication between the own car and a home, or vehicle-to-pedestrian communication. In addition, for example, the communication unit 103 includes a beacon receiver, receives a radio wave or an electromagnetic wave transmitted from a radio station installed on a road or the like, and acquires information regarding the current location, traffic congestion, traffic regulation, necessary time, or the like.

The in-vehicle equipment 104 includes mobile equipment or wearable equipment possessed by a passenger, information equipment carried into or attached to the own car, a navigation apparatus that searches for a route to any destination, and the like, for example.

The output control unit 105 controls output of various kinds of information to the passenger of the own car or to an outside of the own car. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of image data captured by different imaging apparatuses included in the data acquisition unit 102, generates a bird's-eye image, a panoramic image, or the like, and supplies an output signal including the generated image to the output unit 106. In addition, for example, the output control unit 105 generates sound data including warning sound, a warning message, or the like with regard to danger such as collision, contact, or entrance into a danger zone, and supplies an output signal including the generated sound data to the output unit 106.

The output unit 106 includes an apparatus capable of outputting the visual information or the audio information to the passenger or the outside of the own car. For example, the output unit 106 includes a display apparatus, an instrument panel, an audio speaker, headphones, a wearable device such as an eyeglass type display worn by the passenger or the like, a projector, a lamp, or the like. Instead of an apparatus including a usual display, the display apparatus included in the output unit 106 may be, for example, an apparatus that displays the visual information within a field of view of the driver such as a head-up display, a transparent display, an apparatus having an augmented reality (AR) function, or the like.

The drivetrain control unit 107 generates various kinds of control signals, supplies them to the drivetrain system 108, and thereby controls the drivetrain system 108. In addition, as necessary, the drivetrain control unit 107 supplies the control signals to structural elements other than the drivetrain system 108 and notifies them of a control state of the drivetrain system 108 or the like.

The drivetrain system 108 includes various kinds of apparatuses related to the drivetrain of the own car. For example, the drivetrain system 108 includes a driving force generation apparatus for generating driving force of an internal combustion engine, a driving motor, or the like, a driving force transmitting mechanism for transmitting the driving force to wheels, a steering mechanism for adjusting the steering angle, a braking apparatus for generating braking force, an anti-lock braking system (ABS), an electronic stability control (ESC) system, an electric power steering apparatus, or the like.

The body control unit 109 generates various kinds of control signals, supplies them to the body system 110, and thereby controls the body system 110. In addition, as necessary, the body control unit 109 supplies the control signals to structural elements other than the body system 110 and notifies them of a control state of the body system 110 or the like.

The body system 110 includes various kinds of body apparatuses provided to a vehicle body. For example, the body system 110 includes a keyless entry system, a smart key system, a power window apparatus, a power seat, the steering wheel, an air conditioner, various kinds of lamps (such as headlamps, tail lamps, brake lamps, direction-indicator lamps, and fog lamps), and the like.

The storage unit 111 includes read only memory (ROM), random access memory (RAM), a magnetic storage device such as a hard disc drive (HDD) or the like, a semiconductor storage device, an optical storage device, a magneto-optical storage device, or the like, for example. The storage unit 111 stores various kinds of programs, data, and the like used by respective units of the vehicle control system 100. For example, the storage unit 111 stores map data such as a three-dimensional high-accuracy map, a global map, and a local map. The high-accuracy map is a dynamic map or the like. The global map has lower accuracy than the high-accuracy map but covers wider area than the high-accuracy map. The local map includes information regarding surroundings of the own car.

The autonomous driving control unit 112 performs control with regard to autonomous driving such as autonomous travel or driving assistance. Specifically, for example, the autonomous driving control unit 112 performs cooperative control intended to implement functions of an advanced driver-assistance system (ADAS) which include collision avoidance or shock mitigation for the own car, following driving based on a following distance, vehicle speed maintaining driving, a warning of collision of the own car, a warning of deviation of the own car from a lane, or the like. In addition, for example, it is also possible for the autonomous driving control unit 112 to perform cooperative control intended for autonomous driving that makes the vehicle travel autonomously without depending on the operation of the driver or the like. The autonomous driving control unit 112 includes a detection unit 131, a self location estimation unit 132, a situation analysis unit 133, a planning unit 134, and a behavior control unit 135.

The detection unit 131 detects various kinds of information necessary to control autonomous driving. The detection unit 131 includes a vehicle exterior information detection unit 141, a vehicle interior information detection unit 142, and a vehicle state detection unit 143.

The vehicle exterior information detection unit 141 performs a process of detecting information regarding an outside of the own car on the basis of data or signals from the respective units of the vehicle control system 100. For example, the vehicle exterior information detection unit 141 performs a detection process, a recognition process, and a tracking process of objects around the own car, and a process of detecting distances to the objects. Examples of the detection target object include a vehicle, a person, an obstacle, a structure, a road, a traffic light, a traffic sign, a road sign, and the like. In addition, for example, the vehicle exterior information detection unit 141 performs a process of detecting an ambient environment around the own car. Examples of the ambient environment around the detection target includes weather, temperature, humidity, brightness, a road surface condition, and the like, for example. The vehicle exterior information detection unit 141 supplies data indicating results of the detection processes to the self location estimation unit 132, a map analysis unit 151, a traffic rule recognition unit 152, and a situation recognition unit 153 of the situation analysis unit 133, an emergency event avoiding unit 171 of the behavior control unit 135, and the like.

The vehicle interior information detection unit 142 performs a process of detecting information regarding an inside of the vehicle on the basis of data or signals from the respective units of the vehicle control system 100. For example, the vehicle interior information detection unit 142 performs an authentication process and a recognition process of the driver, a detection process of a state of the driver, a detection process of a passenger, a detection process of a vehicle interior environment, and the like. Examples of the state of the driver, which is a detection target, include a health condition, a degree of consciousness, a degree of concentration, a degree of fatigue, a gaze direction, and the like. Examples of the vehicle interior environment, which is a detection target, include temperature, humidity, brightness, smell, and the like. The vehicle interior information detection unit 142 supplies data indicating results of the detection processes to the situation recognition unit 153 of the situation analysis unit 133, the emergency event avoiding unit 171 of the behavior control unit 135, and the like.

The vehicle state detection unit 143 performs a process of detecting a state of the own car on the basis of data or signals from the respective units of the vehicle control system 100. Examples of the state of the own car, which is a detection target, includes speed, acceleration, a steering angle, presence/absence of abnormality, a content of the abnormality, a driving operation state, a position and inclination of the power seat, a state of a door lock, states of other vehicle-mounted equipment, and the like. The vehicle state detection unit 143 supplies data indicating results of the detection processes to the situation recognition unit 153 of the situation analysis unit 133, the emergency event avoiding unit 171 of the behavior control unit 135, and the like.

The self location estimation unit 132 performs a process of estimating a location, a posture, and the like of the own car on the basis of data or signals from the respective units of the vehicle control system 100 such as the vehicle exterior information detection unit 141 and the situation recognition unit 153 of the situation analysis unit 133. In addition, as necessary, the self location estimation unit 132 generates a local map (hereinafter, referred to as a self location estimation map) to be used for estimating a self location. For example, the self location estimation map may be a high-accuracy map using a technology such as simultaneous localization and mapping (SLAM). The self location estimation unit 132 supplies data indicating a result of the estimation process to the map analysis unit 151, the traffic rule recognition unit 152, and the situation recognition unit 153 of the situation analysis unit 133, and the like. In addition, the self location estimation unit 132 causes the storage unit 111 to store the self location estimation map.

The situation analysis unit 133 performs a process of analyzing a situation of the own car and a situation around the own car. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 and constructs a map including information necessary for an autonomous driving process while using data or signals from the respective units of the vehicle control system 100 such as the self location estimation unit 132 and the vehicle exterior information detection unit 141 as necessary. The map analysis unit 151 supplies the constructed map to the traffic rule recognition unit 152, the situation recognition unit 153, and the situation prediction unit 154, and to a route planning unit 161, an action planning unit 162, a behavior planning unit 163 of the planning unit 134, and the like.

The traffic rule recognition unit 152 performs a process of recognizing traffic rules around the own car on the basis of data or signals from the respective units of the vehicle control system 100 such as the self location estimation unit 132, the vehicle exterior information detection unit 141, and the map analysis unit 151. The recognition process makes it possible to recognize locations and states of traffic lights around the own car, contents of traffic control around the own car, a drivable lane, and the like, for example. The traffic rule recognition unit 152 supplies data indicating a result of the recognition process to the situation prediction unit 154 and the like.

The situation recognition unit 153 performs a process of recognizing situations related to the own car on the basis of data or signals from the respective units of the vehicle control system 100 such as the self location estimation unit 132, the vehicle exterior information detection unit 141, the vehicle interior information detection unit 142, the vehicle condition detection unit 143, and the map analysis unit 151. For example, the situation recognition unit 153 performs a process of recognizing a situation of the own car, a situation around the own car, a situation of the driver of the own car, and the like. In addition, as necessary, the situation recognition unit 153 generates a local map (hereinafter, referred to as a situation recognition map) to be used for recognizing the situation around the own car. For example, the situation recognition map may be an occupancy grid map.

Examples of the situation of the own car, which is a recognition target, include a location, a posture, and movement (such as speed, acceleration, or a movement direction, for example) of the own car, presence/absence of abnormality, contents of the abnormality, and the like. Examples of the situation around the own car, which is a recognition target, include types and locations of surrounding still objects, types, locations, and movement (such as speed, acceleration, and movement directions, for example) of surrounding moving objects, structures of surrounding roads, conditions of road surfaces, ambient weather, temperature, humidity, brightness, and the like. Examples of the state of the driver, which is a recognition target, include a health condition, a degree of consciousness, a degree of concentration, a degree of fatigue, movement of gaze, driving operation, and the like.

The situation recognition unit 153 supplies data indicating a result of the recognition process (including the situation recognition map as necessary) to the self location estimation unit 132, the situation prediction unit 154, and the like. In addition, the situation recognition unit 153 causes the storage unit 111 to store the situation recognition map.

The situation prediction unit 154 performs a process of predicting a situation related to the own car on the basis of data or signals from the respective units of the vehicle control system 100 such as the map analysis unit 151, the traffic rule recognition unit 152, and the situation recognition unit 153. For example, the situation prediction unit 154 performs a process of predicting a situation of the own car, a situation around the own car, a situation of the driver, and the like.

Examples of the situation of the own car, which is a prediction target, includes behavior of the own car, occurrence of abnormality, a drivable distance, and the like. Examples of the situation around the own car, which is a prediction target, includes behavior of moving objects, change in states of traffic lights, change in environments such as weather, and the like around the own car. Examples of the situation of the driver, which is a prediction target, includes behavior, a health condition, and the like of the driver.

The situation prediction unit 154 supplies data indicating results of the prediction processes to the route planning unit 161, the action planning unit 162, and the behavior planning unit 163 of the planning unit 134 and the like in addition to the data from the traffic rule recognition unit 152 and the situation recognition unit 153.

The route planning unit 161 plans a route to a destination on the basis of data or signals from the respective units of the vehicle control system 100 such as the map analysis unit 151 and the situation prediction unit 154. For example, the route planning unit 161 sets a route from the current location to a specified destination on the basis of the global map. In addition, for example, the route planning unit 161 appropriately changes the route on the basis of situations such as traffic congestion, accidents, traffic regulation, and construction, and a health condition and the like of the driver. The route planning unit 161 supplies data indicating the planned route to the action planning unit 162 and the like.

The action planning unit 162 planes an action of the own car for driving safely in the route planned by the route planning unit 161 within a planned time period, on the basis of data or signals from the respective units of the vehicle control system 100 such as the map analysis unit 151 and the situation prediction unit 154. For example, the action planning unit 162 plans start, stop, a driving direction (for example, forward, backward, left turn, right turn, change of direction, etc.), a driving lane, driving speed, overtaking, and the like. The action planning unit 162 supplies data indicating the action planned for the own car to the behavior planning unit 163 and the like.

The behavior planning unit 163 plans behavior of the own car for achieving the action planned by the action planning unit 162 on the basis of data or signals from the respective units of the vehicle control system 100 such as the map analysis unit 151 and the situation prediction unit 154. For example, the behavior planning unit 163 plans acceleration, deceleration, a driving course, and the like. The behavior planning unit 163 supplies data indicating the planed behavior of the own car to an acceleration/deceleration control unit 172, a direction control unit 173, and the like of the behavior control unit 135.

The behavior control unit 135 controls behavior of the own car. The behavior control unit 135 includes the emergency event avoiding unit 171, the acceleration/deceleration control unit 172, and the direction control unit 173.

The emergency event avoiding unit 171 performs a process of detecting collision, contact, entrance into a danger zone, or an emergency event such as abnormality in the driver or abnormality in the vehicle on the basis of detection results obtained by the vehicle exterior information detection unit 141, the vehicle interior information detection unit 142, and the vehicle state detection unit 143. In the case where occurrence of an emergency event is detected, the emergency event avoiding unit 171 plans behavior of the own car such as a quick stop or a quick turn for avoiding the emergency event. The emergency event avoiding unit 171 supplies data indicating the planned behavior of the own car to the acceleration/deceleration control unit 172, the direction control unit 173, or the like.

The acceleration/deceleration control unit 172 controls acceleration/deceleration to achieve the behavior of the own car planned by the behavior planning unit 163 or the emergency event avoiding unit 171. For example, the acceleration/deceleration control unit 172 computes a control goal value of the driving force generation apparatus or the braking apparatus to achieve the planned acceleration, deceleration, or quick stop, and supplies a control instruction indicating the computed control goal value to the drivetrain control unit 107.

The direction control unit 173 controls a direction to achieve the behavior of the own car planned by the behavior planning unit 163 or the emergency event avoiding unit 171. For example, the direction control unit 173 computes a control goal value of the steering mechanism to achieve a driving course or quick turn planned by the behavior planning unit 163 or the emergency event avoiding unit 171, and supplies a control instruction indicating the computed control goal value to the drivetrain control unit 107.

The vehicle control system 100 has the configuration as described above. The first image sensor 211, the second image sensor 221, the first GNSS reception unit 212, and the second GNSS reception unit 222 of the first mobile object 210 and the second mobile object 220 are included in the data acquisition unit 102 of the vehicle control system 100.

In addition, the first communication unit 213 and the second communication unit 223 of the first mobile object 210 and the second mobile object 220 correspond to the communication unit 103 of the vehicle control system 100. In addition, the first information processing unit 214 and the second information processing unit 214 of the first mobile object 210 and the second mobile object 220 correspond to the self location estimation unit of the vehicle control system 100.

Note that the configuration of the vehicle control system 100 is an example. The first mobile object 210 and the second mobile object 220 only need to achieve GNSS positioning including a carrier phase distance, which will be described later, and do not necessarily have the same configuration as that of the vehicle control system 100.

[Functional Configuration of Positioning System]

Figure 6:
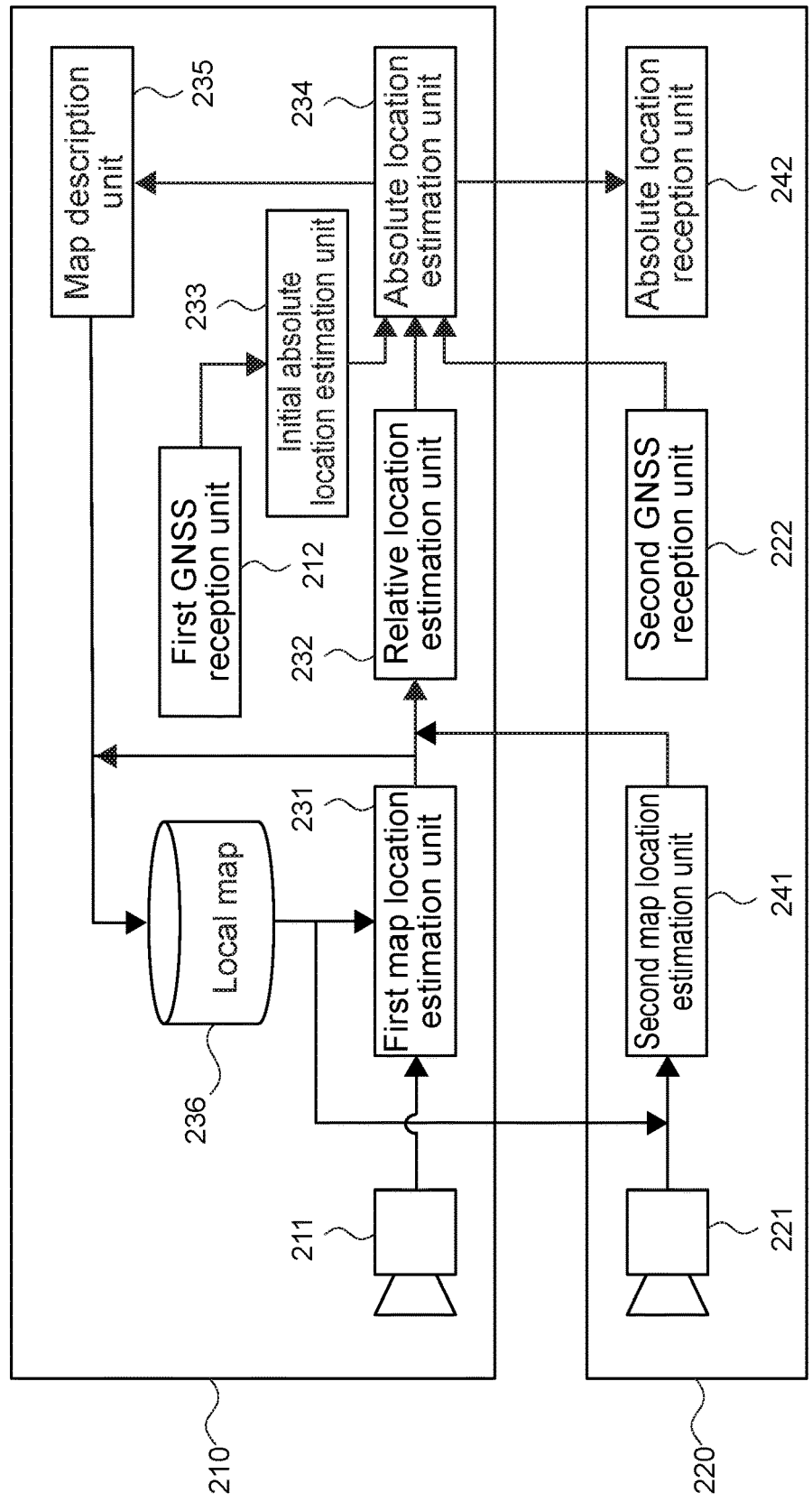
FIG. 6 is a block diagram showing a functional configuration of the positioning system according to this embodiment.

FIG. 6 is a block diagram showing a functional configuration of the positioning system 200.

As shown in the figure, the first mobile object 210 includes the first image sensor 211, the first GNSS reception unit 212, a first map location estimation unit 231, a relative location estimation unit 232, an initial absolute location estimation unit 233, an absolute location estimation unit 234, a map description unit 235, and a local map 236.

In addition, the second mobile object 220 includes the second image sensor 221, the second GNSS reception unit 222, a second map location estimation unit 241, and an absolute location reception unit 242.

Figure 7:
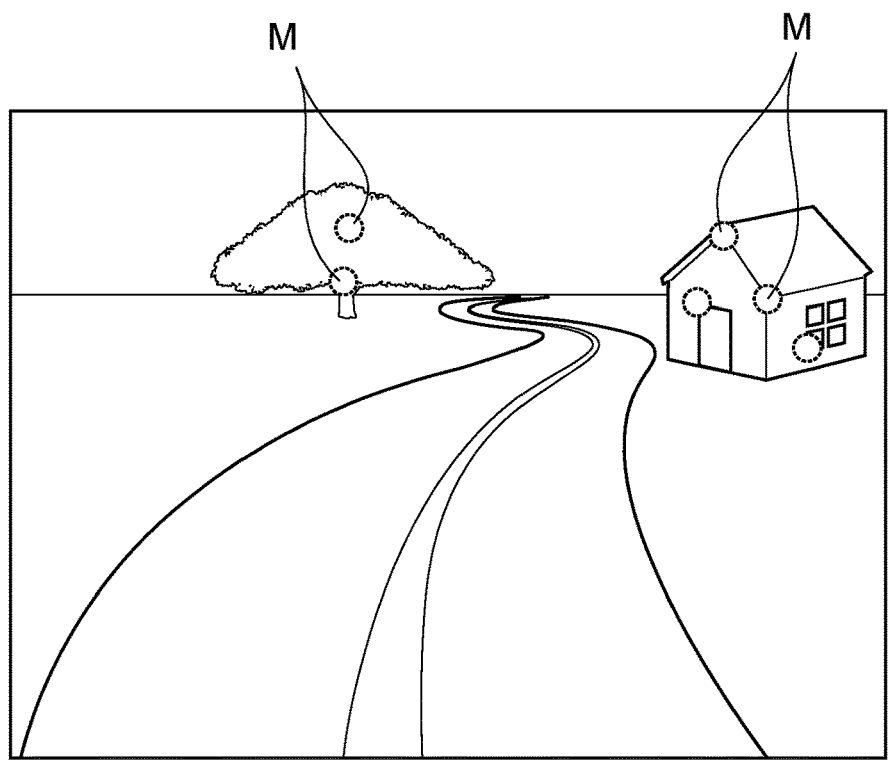
FIG. 7 is a schematic diagram of a local map of the positioning system.

FIG. 7 is a schematic diagram showing the general outline of the local map 236. As shown in the figure, the local map 236 includes landmark points M. The landmark points M are characteristic points in the image, and three-dimensional coordinates of the points are known. In addition, the local map 236 also includes two-dimensional coordinates of the feature points when the landmark points M are seen from a specific direction. The landmark points M may be set in advance or may be set by the map description unit 235 as will be described later.

The first map location estimation unit 231 estimates a location of the first mobile object 210 with respect to the local map 236 (hereinafter, first map location). The map location estimation unit 231 can estimate the first map location by using simultaneous localization and mapping (SLAM).

Figure 8:
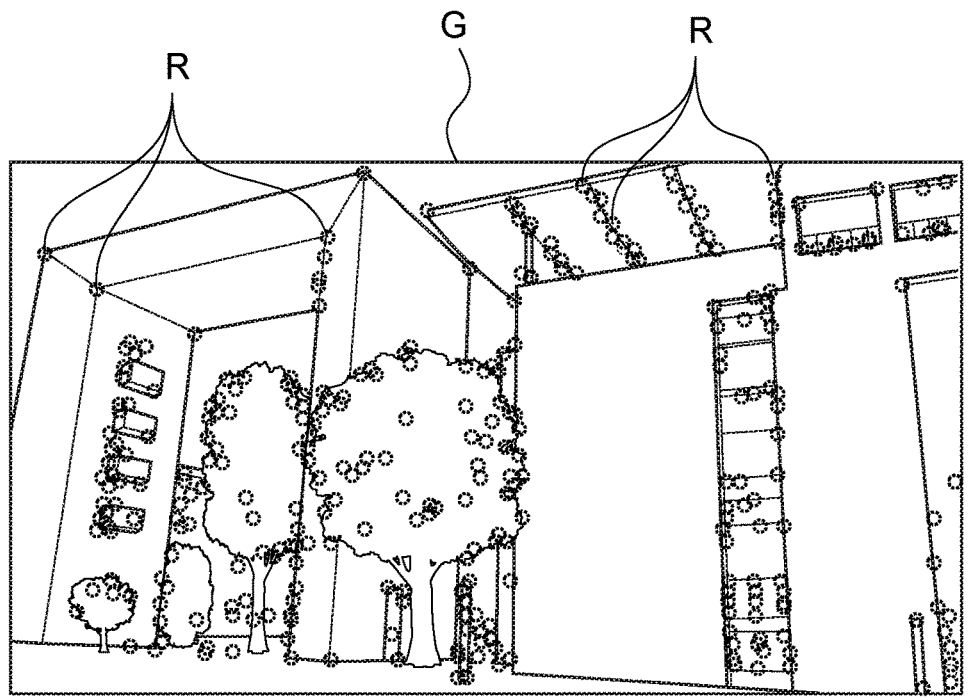
FIG. 8 is an example of a first captured image, which is captured by a first mobile object of the positioning system, and feature points extracted from the first captured image.

Specifically, the first map location estimation unit 231 extracts feature points in the first captured image captured by the first image sensor 211. FIG. 8 is a schematic diagram showing a first captured image G and feature points R extracted by the first map location estimation unit 231.

The first map location estimation unit 231 can extract the feature points by any image process. Moreover, the first map location estimation unit 231 matches the extracted feature points R with the feature points (landmark points M seen from specific direction) included in the local map 236.

Figure 9:
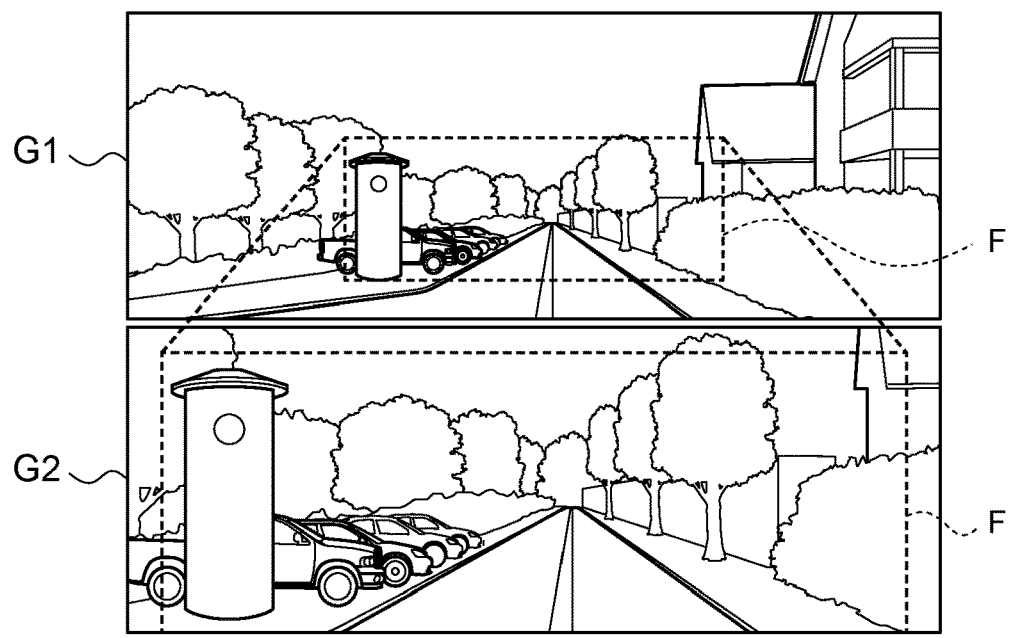
FIG. 9 is a schematic diagram showing a change of the first captured image by movement of the first mobile object of the positioning system.

In addition, the first map location estimation unit 231 calculates movement of the feature points based on movement of the first mobile object 210. FIG. 9 is a schematic diagram showing a first captured image G1 and a first captured image G2. The first captured image G2 is the frame next to the first captured image G1. A frame F shown in each of the first captured image G1 and the first captured image G2 indicates the same range of a subject.

As shown in the figure, the first captured image changes in accordance with the movement of the first mobile object 210, and the feature points also move. The amount of movement and a movement direction differ depending on a location relationship between the first image sensor 211 and the subject.

Figure 10:
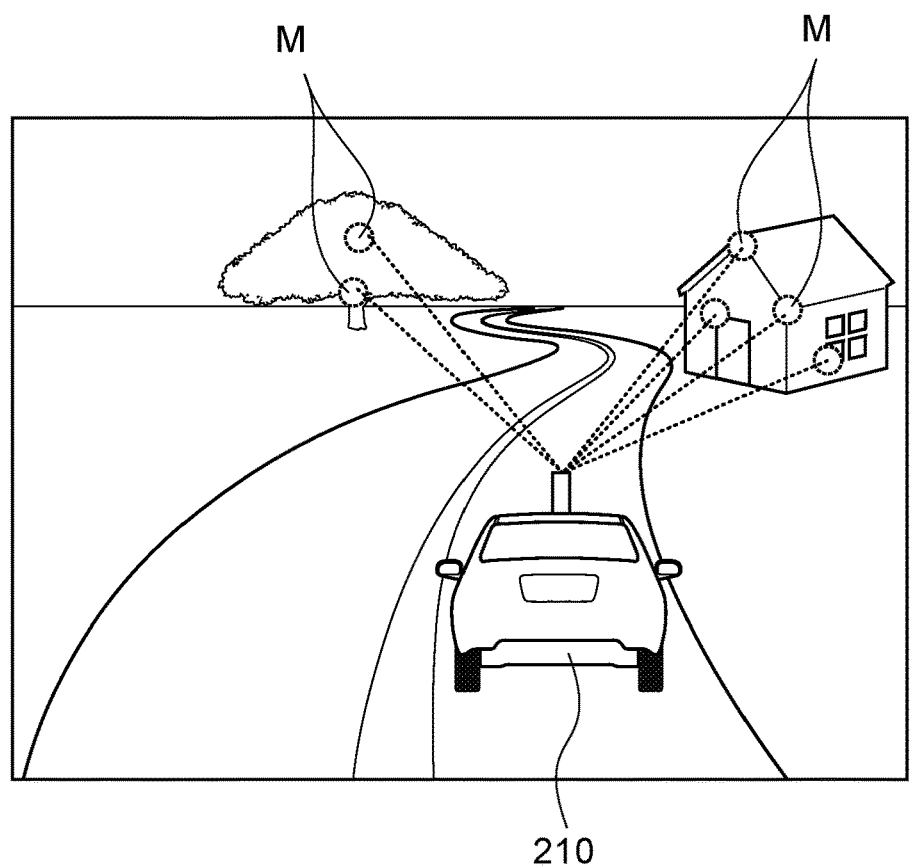
FIG. 10 is a schematic diagram showing a location relationship between the first mobile object and landmark points in the positioning system.

FIG. 10 is a schematic diagram showing a location relationship between the first mobile object 210 and the landmark points M. The first map location estimation unit 231 can identify the first map location from three-dimensional coordinates of the landmark points M and the change in feature points in association with the movement of the first mobile object 210 as shown in the figure.

Note that the first map location estimation unit 231 can also specify a map location by a technique other than SLAM, such as Visual Odometry. The first map location estimation unit 231 supplies the estimated first map location to the relative location estimation unit 232.

In addition, in the second mobile object 220, the second map location estimation unit 241 estimates a location of the second mobile object 220 with respect to the local map 236 (hereinafter, second map location). The second map location estimation unit 241 can acquire the local map 236 from the first mobile object 210 via the second communication unit 223.

The second map location estimation unit 241 extracts feature points in the second captured image captured by the second image sensor 221 as in the first map location estimation unit 231 and matches the extracted feature points with the feature points included in the local map 236. Moreover, the second map location estimation unit 241 can estimate a second map location from the three-dimensional coordinates of the landmark points M and the change in feature points in association with the movement of the second mobile object 220.

The second map location estimation unit 241 supplies the estimated second map location to the relative location estimation unit 232 via the second communication unit 223.

The relative location estimation unit 232 estimates relative locations of the first mobile object 210 and the second mobile object 220. The relative location estimation unit 232 can estimate the relative locations of the first mobile object 210 and the second mobile object 220 from the first map location and the second map location.

Figure 11:
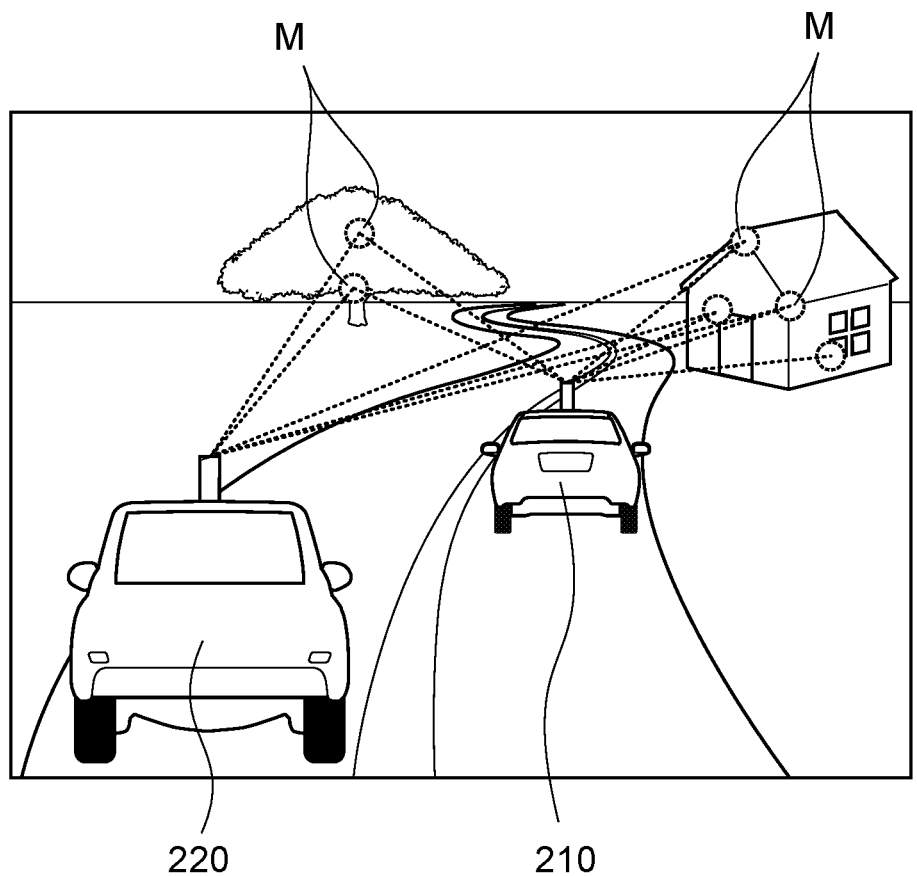
FIG. 11 is a schematic diagram showing estimation of relative locations by sharing a local map between the first mobile object and a second mobile object in the positioning system.

FIG. 11 is a schematic diagram showing the estimation of relative locations by sharing the local map 236. As shown in the figure, the relative location estimation unit 232 can estimate relative locations of the first mobile object 210 and the second mobile object 220 from a location relationship of each of the first mobile object 210 and the second mobile object 220 with respect to the landmark points M in the local map 236. The relative location estimation unit 232 supplies the estimated relative locations to the absolute location estimation unit 234.

The first GNSS reception unit 212 supplies GNSS positioning information including the measured carrier phase distance (hereinafter, GNSS positioning information using first carrier phase distance) to the initial absolute location estimation unit 233. In addition, the first GNSS reception unit 212 also supplies the measured solitary positioning information to the initial absolute location estimation unit 233.

The initial absolute location estimation unit 233 selects a potential location (see FIG. 3), which is calculated from the GNSS positioning information using the first carrier phase distance, on the basis of the solitary positioning information. The initial absolute location estimation unit 233 can exclude potential locations far from a rough existence location of the first mobile object 210, which is obtained from the solitary positioning information, and can select a potential location close to the rough existence location of the first mobile object. The initial absolute location estimation unit 233 outputs the selected potential location and the GNSS positioning information using the first carrier phase distance to the absolute location estimation unit 234.

In the second mobile object 220, the second GNSS reception unit 222 supplies GNSS positioning information including the measured carrier phase distance (hereinafter, GNSS positioning information using second carrier phase distance) to the absolute location estimation unit 234 via the second communication unit 223 and the first communication unit 213.

The absolute location estimation unit 234 estimates absolute locations of the first mobile object 210 and the second mobile object 220. The absolute location estimation unit 234 can estimate the absolute locations of the first mobile object 210 and the second mobile object 220 on the basis of the relative locations of the first mobile object 210 and the second mobile object 220, the GNSS positioning information using the first carrier phase distance, and the GNSS positioning information using the second carrier phase distance.

Figure 12:
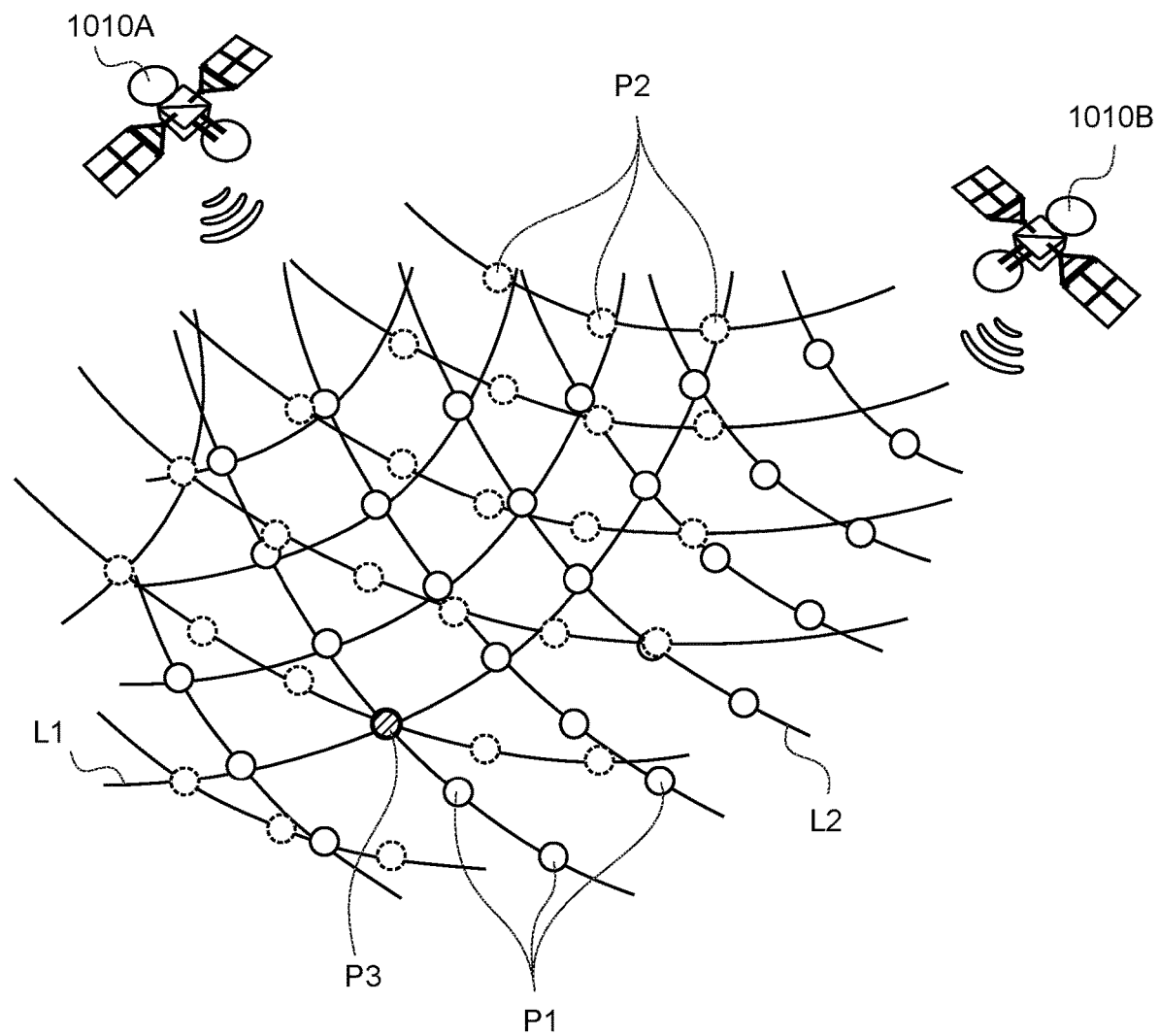
FIG. 12 is a schematic diagram showing estimation of absolute locations of the first mobile object and the second mobile object in the positioning system.

FIG. 12 is a schematic diagram showing the method of estimating the absolute locations of the first mobile object 210 and the second mobile object 220 by the absolute location estimation unit 234. Potential locations P1 in the figure are potential locations of the first GNSS reception unit 212 and are locations having the same phase as the phase of the carrier waves measured by the first GNSS reception unit 212. Potential location P2 in the figure are potential locations of the second GNSS reception unit 222 and are locations having the same phase as the phase of the carrier waves measured by the second GNSS reception unit 222.

As shown in the figure, if a location P3 at which the potential location P1 and the potential location P2 overlap is identified, a solution of an integer bias is obtained, and the absolute location estimation unit 234 can estimate absolute locations of the first GNSS reception unit 212 and the second GNSS reception unit 222, that is, absolute locations of the first mobile object 210 and the second mobile object 220.

The absolute location estimation unit 234 supplies the estimated absolute location of the first mobile object 210 to the map description unit 235. In addition, the absolute location estimation unit 234 supplies the estimated absolute location of the second mobile object 220 to the absolute location reception unit 242 via the second communication unit 223.

The absolute location reception unit 242 receives the absolute location of the second mobile object 220 from the first mobile object 210, and thus the second mobile object 220 can acquire a self absolute location.

The map description unit 235 can add information to the local map 236 by using the absolute location and a map relative location of the first mobile object 210 as will be described later.

The positioning system 200 estimates the absolute locations of the first mobile object 210 and the second mobile object 220 as described above. As described above, the positioning system 200 can solve the integer bias by using the relative locations of the first mobile object 210 and the second mobile object 220 and can perform GNSS positioning using a high-speed carrier phase distance.

Note that, in the above description, the absolute location estimation unit 234 of the first mobile object 210 estimates the absolute locations of the first mobile object 210 and the second mobile object 220 and transmits the absolute location to the second mobile object 220, but the configuration of the positioning system 200 is not limited thereto. The second mobile object 220 may also have a configuration similar to that of the first mobile object 210 and may acquire the first map location and the GNSS positioning information using the first carrier phase distance from the first mobile object 210 and estimate its own absolute location.

In addition, it is assumed that the first mobile object 210 and the second mobile object 220 communicate with each other via the first communication unit 213 and the second communication unit 223, but the first communication unit 213 and the second communication unit 223 may communicate with each other via a server. For example, the second communication unit 223 may transmit the GNSS positioning information using the second carrier phase distance and the second map location to the server, and the first communication unit 213 may receive the GNSS positioning information using the second carrier phase distance and the second map location from the server.

In addition, the server may also include the local map 236, and the first mobile object 210 may acquire the local map 236 from the server via the first communication unit 213 and use it.

Moreover, the first map location estimation unit 231 and the second map location estimation unit 241 estimate the first map location and the second map location by using the captured images captured by the first image sensor 211 and the second image sensor 221 and the local map, but the present technology is not limited thereto.

Each of the first mobile object 210 and the second mobile object 220 may include a surrounding information detection sensor (above-mentioned LiDAR or the like) other than the image sensor, and the first map location estimation unit 231 and the second map location estimation unit 241 may estimate the first map location and the second map location by using outputs of the surrounding information detection sensors and the local map.

[Regarding Map Location Estimation Unit and Map Description Unit]

Figure 13:
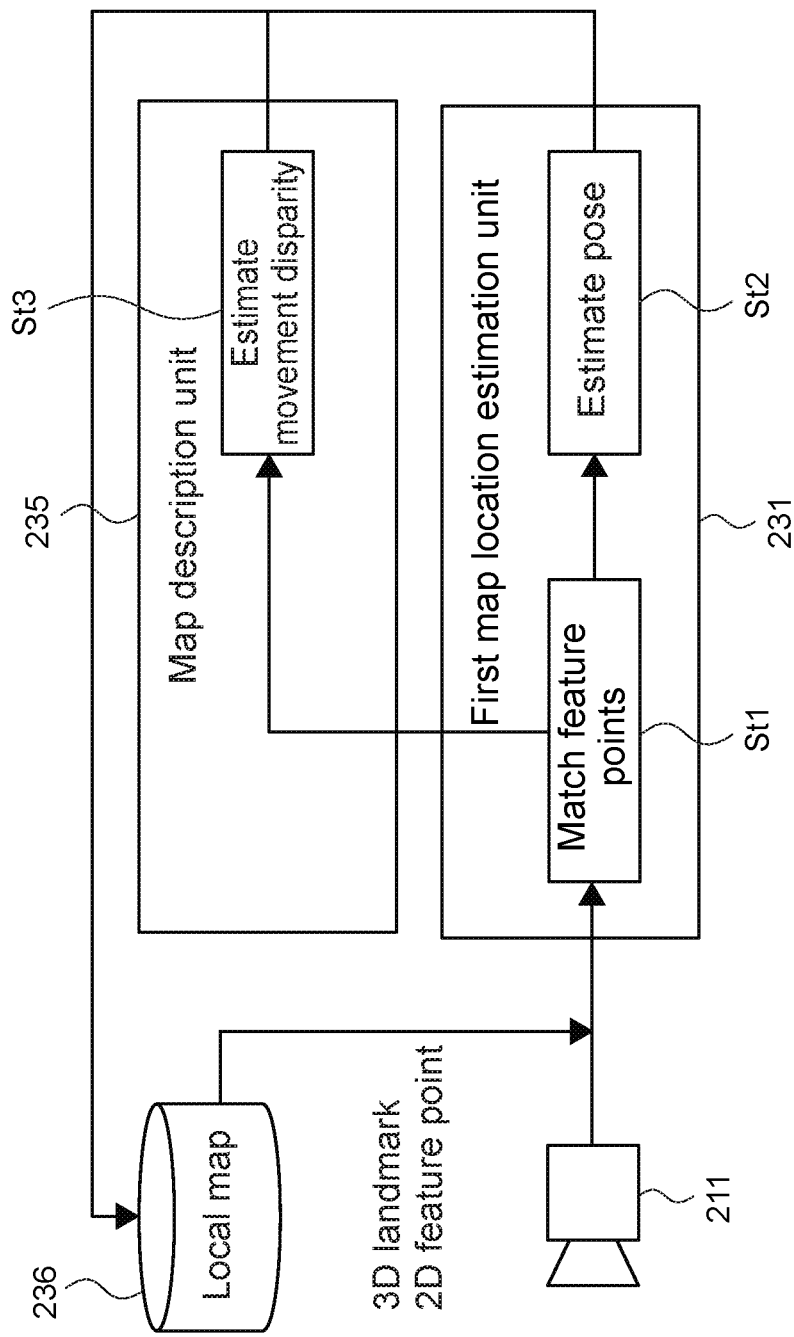
FIG. 13 is a schematic diagram showing a method of creating a local map in the positioning system.

FIG. 13 is a schematic diagram showing a method of creating the local map 236 by the first map location estimation unit 231 and the map description unit 235.

As shown in the figure, the first map location estimation unit 231 extracts the feature points from the first captured image acquired from the first image sensor 211 and matches the extracted feature points with the feature points included in the local map 236 (St1).

Subsequently, the first map location estimation unit 231 estimates a pose (location and orientation) of the first mobile object 210 in the local map 236 on the basis of a matching result of the feature points (St2). The first map location estimation unit 231 supplies the estimated pose of the first mobile object 210 to the local map 236.

The map description unit 235 estimates a disparity due to the movement of the first mobile object 210 from the amount of movement of the feature points between frames of the captured image (St3) and creates the locations of the feature points in a three-dimensional space, that is, landmark points, on the basis of the absolute location of the first mobile object 210, the first map location, and the disparity. The map description unit 235 describes the created landmark points in the local map 236 and updates the local map 236.

The first map location estimation unit 231 and the map description unit 235 can create the local map 236 as described above.

[Regarding Image Capturing Time]

As described above, the first map location estimation unit 231 and the second map location estimation unit 241 estimate the first map location and the second map location by using the landmark points M included in the first captured image and the second captured image. In addition, the relative location estimation unit 232 estimates relative locations of the first mobile object 210 and the second mobile object 220 on the basis of the first map location and the second map location.

Here, the first captured image and the second captured image only need to include specific landmark points M, and the first captured image and the second captured image do not need to be images simultaneously captured. In other words, the first image sensor 211 may capture a first captured image with the landmark points M being included in the field of view, and after a certain period of time, the second image sensor 221 may capture a second captured image with the landmark points M being included in the field of view.

Also in this case, the absolute locations of the first mobile object 210 and the second mobile object 220 can be estimated on the basis of the GNSS positioning information using the first carrier phase distance in the first map location at a specific time and the GNSS positioning information using the second carrier phase distance in the second map location at a different time.

[Another Configuration of Positioning System]

Figure 14:
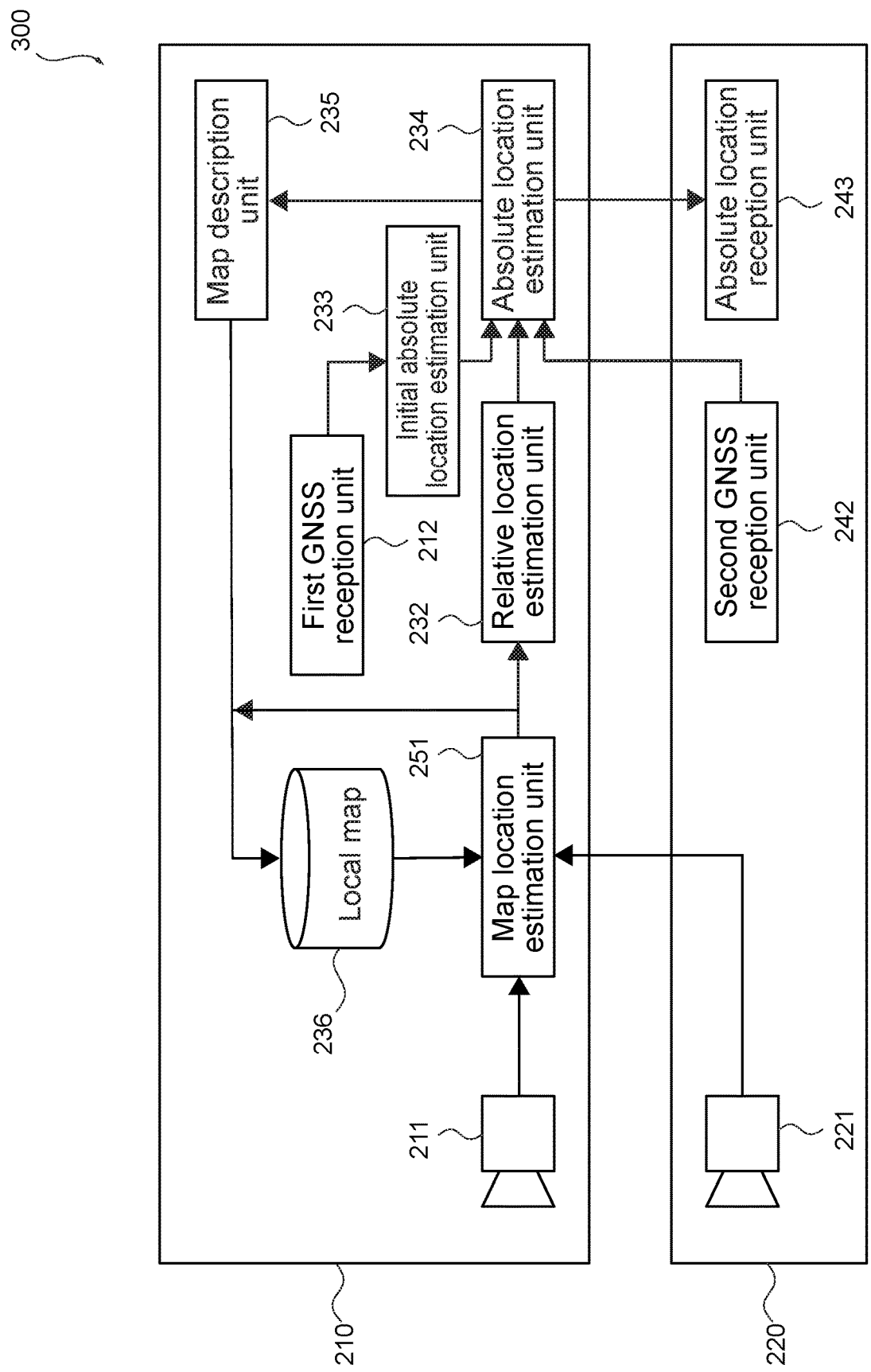
FIG. 14 is a block diagram showing a functional configuration of a positioning system having another configuration according to this embodiment.

The positioning system according to this embodiment may also be configured as follows. FIG. 14 is a schematic diagram showing a functional configuration of a positioning system 300 according to this embodiment. Note that in the configurations of the positioning system 300, configurations similar to those in the positioning system 200 described above are denoted by similar reference symbols and description thereof will be omitted. As shown in the figure, the first mobile object 210 includes a map location estimation unit 251 instead of the first map location estimation unit 231.

The map location estimation unit 251 estimates a first map location from the first captured image and the local map 236. In addition, the map location estimation unit 251 acquires a second captured image from the second mobile object 220, the second captured image being captured by the second image sensor 221, and estimates a second map location from the second captured image and the local map 236.

The map location estimation unit 251 supplies the estimated first map location and second map location to the relative location estimation unit 232. In such a manner, it may be possible to transmit the second captured image from the second mobile object 220 to the first mobile object 210 and to estimate a second map location in the first mobile object 210.

Figure 15:
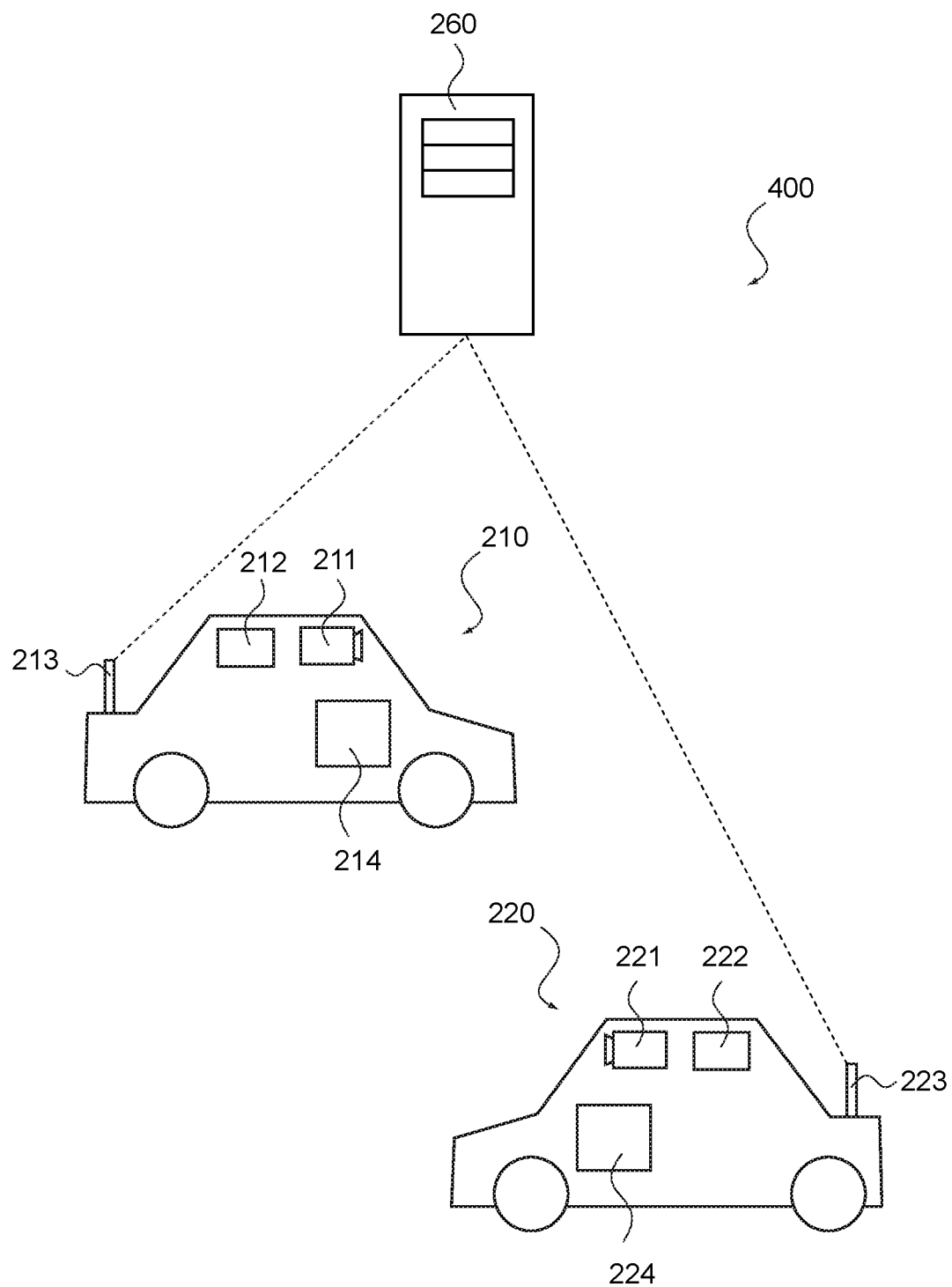
FIG. 15 is a schematic diagram showing a configuration of a positioning system having another configuration according to this embodiment.

In addition, the positioning system according to this embodiment may be achieved by the first mobile object 210, the second mobile object 220, and a server. FIG. 15 is a schematic diagram of a positioning system 400 including the first mobile object 210, the second mobile object 220, and a server 260. Note that in the configurations of the positioning system 400, configurations similar to those of the positioning system 200 described above are denoted by similar reference symbols and description thereof will be omitted.

Figure 16:
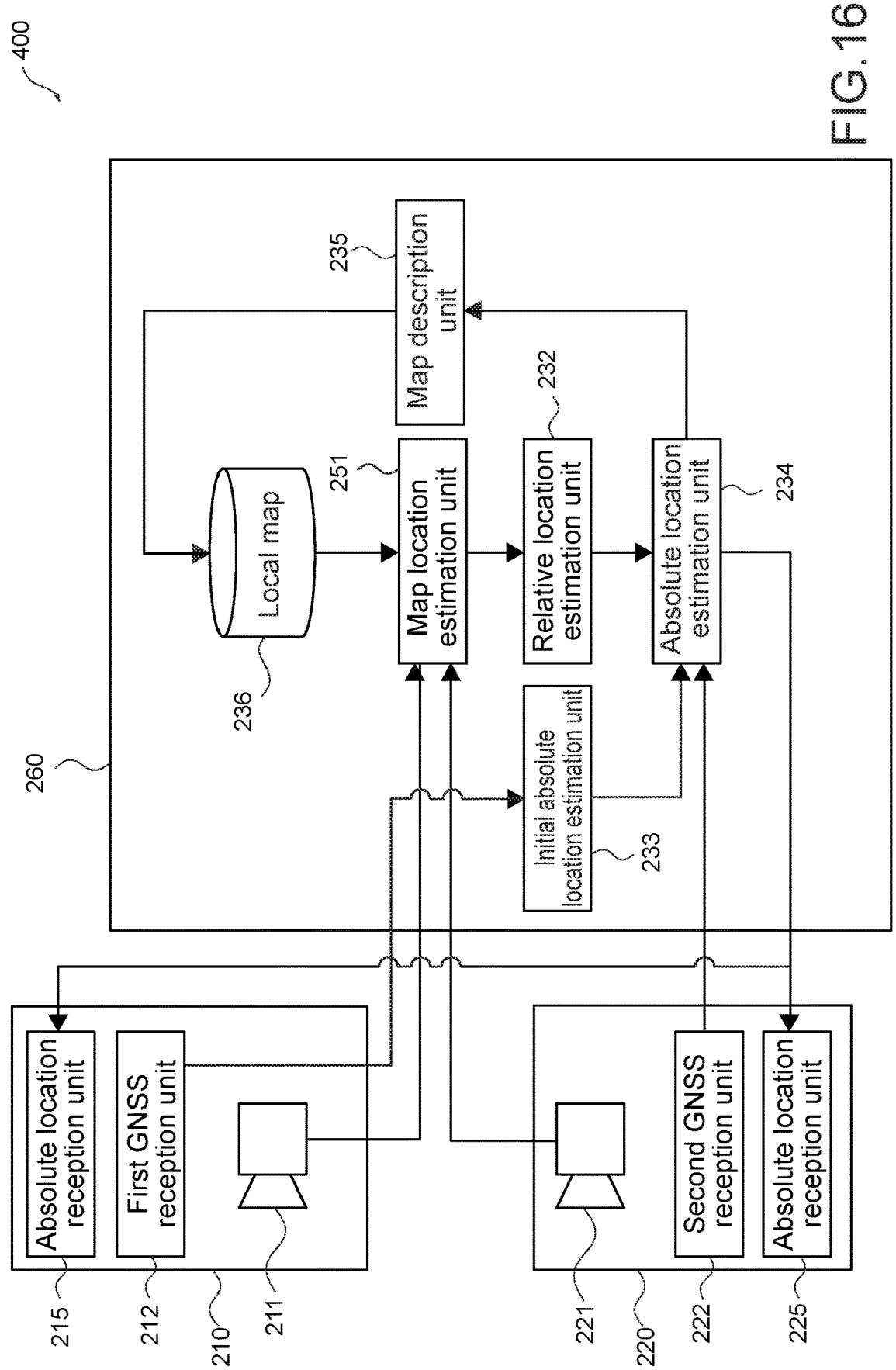
FIG. 16 is a block diagram showing a functional configuration of the positioning system.

As shown in the figure, the first mobile object 210 and the second mobile object 220 are connected to the server 260 via the first communication unit 213 and the second communication unit 223, respectively. FIG. 16 is a schematic diagram showing a functional configuration of the positioning system 400.

The first mobile object 210 includes the first image sensor 211, the first GNSS reception unit 212, and an absolute location reception unit 215, and the second mobile object 220 includes the second image sensor 221, the second GNSS reception unit 222, and an absolute location reception unit 225.

The server 260 includes a map location estimation unit 251, a relative location estimation unit 232, an initial absolute location estimation unit 233, an absolute location estimation unit 234, a map description unit 235, and a local map 236.

In this configuration, a first captured image captured by the first image sensor 211 and a second captured image captured by the second image sensor 221 are transmitted to the map location estimation unit 251, and the map location estimation unit 251 estimate a first map location and a second map location.

In addition, solitary positioning information and GNSS positioning information using a first carrier phase distance, which are received by the first GNSS reception unit 212, are transmitted to the absolute location estimation unit 234 via the initial absolute location estimation unit 233. Moreover, GNSS positioning information using a second carrier phase distance, which is received by the second GNSS reception unit 222, is transmitted to the absolute location estimation unit 234.

The absolute location estimation unit 234 can estimate absolute locations of the first mobile object 210 and the second mobile object 220 on the basis of the relative locations of the first mobile object 210 and the second mobile object 220, the GNSS positioning information using the first carrier phase distance, and the GNSS positioning information of the second carrier phase distance.

The absolute location of the first mobile object 210 is transmitted from the server 260 to the absolute location reception unit 215, and the absolute location of the second mobile object 220 is transmitted from the server 260 to the absolute location reception unit 225. In such a manner, the first mobile object 210 and the second mobile object 220 can acquire the absolute locations thereof.

In addition, at least one of the first mobile object 210 or the second mobile object 220 may include a map location estimation unit and supply the first map location and the second map location, instead of the captured images, to the relative location estimation unit 232.

Note that the present technology can have the following configuration.

(1)

A mobile object, including:

a sensor that acquires surrounding information;

a map location estimation unit that estimates a self location in a local map on the basis of an output of the sensor;

a relative location estimation unit that estimates, from a location of another mobile object in the local map and the self location in the local map, a self relative location with respect to the other mobile object;

a GNSS reception unit that receives global navigation satellite system (GNSS) positioning information using a first carrier phase distance; and an absolute location estimation unit that estimates a self absolute location on the basis of the GNSS positioning information using the first carrier phase distance, GNSS positioning information using a second carrier phase distance, and the relative location, the GNSS positioning information using the second carrier phase distance being received by the other mobile object.

(2)

The mobile object according to (1), in which the sensor is an image sensor capable of capturing an image, and the map location estimation unit extracts a feature point in a first captured image captured by the image sensor, and estimates the self location in the local map from a landmark included in the local map and a change of the feature point due to movement of the mobile object.

(3)

The mobile object according to (2), in which the relative location estimation unit estimates the relative location from the self location in the local map, the self location being estimated by the map location estimation unit, and a location of the other mobile object in the local map, the location of the other mobile object being received from the other mobile object.

(4)

The mobile object according to (2), in which the map location estimation unit receives a second captured image from the other mobile object, the second captured image being captured by an image sensor of the other mobile object, and further estimates a location of the other mobile object in the local map, and the relative location estimation unit estimates the relative location from the self location in the local map, the self location being estimated by the map location estimation unit, and the location of the other mobile object in the local map.

(5)

The mobile object according to any one of (2) to (4), further including a map description unit that creates the landmark by using a time change of the feature point and the self location in the local map, the self location being estimated by the map location estimation unit.

(6)

The mobile object according to (4), in which the first captured image and the second captured image are images captured at the same time.

(7)

The mobile object according to any one of (1) to (6), further including an initial absolute location estimation unit that selects a potential location on the basis of solitary positioning, the potential location being calculated from the GNSS positioning information using the first carrier phase distance.

(8)

The mobile object according to any one of (1) to (7), further including a communication unit that receives the GNSS positioning information using the second carrier phase distance, in which the communication unit receives the GNSS positioning information using the second carrier phase distance from the other mobile object.

(9)

The mobile object according to any one of (1) to (7), further including a communication unit that receives the GNSS positioning information using the second carrier phase distance, in which the communication unit receives the GNSS positioning information using the second carrier phase distance from a server.

(10)

A positioning system, including:
a first mobile object including
a first sensor that acquires surrounding information,
a first map location estimation unit that estimates a self location in a local map on the basis of an output of the first sensor,
a relative location estimation unit that estimates, from a location of a second mobile object in the local map and the self location in the local map, a self relative location with respect to the second mobile object,
a first GNSS reception unit that receives global navigation satellite system (GNSS) positioning information using a first carrier phase distance, and
an absolute location estimation unit that estimates a self absolute location on the basis of the GNSS positioning information using the first carrier phase distance, GNSS positioning information using a second carrier phase distance, and the relative location, the GNSS positioning information using the second carrier phase distance being received by the second mobile object; and
a second mobile object including
a second sensor that acquires surrounding information, and
a second GNSS reception unit that receives the GNSS positioning information using the second carrier phase distance.

(11)

The positioning system according to (10), in which
the first mobile object further includes a first communication unit that receives the GNSS positioning information using the second carrier phase distance, and
the second mobile object further includes a second communication unit that transmits the GNSS positioning information using the second carrier phase distance to the first communication unit.

(12)

The positioning system according to (10) or (11), in which
the second mobile object further includes a second map location estimation unit that estimates the location of the second mobile object in the local map on the basis of an output of the second sensor.

(13)

A positioning system, including:
a first mobile object including
a first sensor that acquires surrounding information, and
a first GNSS reception unit that receives global navigation satellite system (GNSS) positioning information using a first carrier phase distance;
a second mobile object including
a second sensor that acquires surrounding information, and
a second GNSS reception unit that receives GNSS positioning information using a second carrier phase distance; and
a server including
a map location estimation unit that estimates a location of the first mobile object in a local map on the basis of an output of the first sensor and estimates a location of the second mobile object in the local map on the basis of an output of the second sensor,
a relative location estimation unit that estimates, from the location of the first mobile object in the local map and the location of the second mobile object in the local map, a relative location of the first mobile object with respect to the second mobile object, and
an absolute location estimation unit that estimates an absolute location of the first mobile object on the basis of the first RTK-GPS positioning information, the GNSS positioning information using the second carrier phase distance, and the relative location.

(14)

A positioning program that causes an information processing apparatus to function as:
a map location estimation unit that estimates a self location in a local map on the basis of an output of a sensor that acquires surrounding information;
a relative location estimation unit that estimates, from a location of another mobile object in the local map and the self location in the local map, a self relative location with respect to the other mobile object; and
an absolute location estimation unit that estimates a self absolute location on the basis of global navigation satellite system (GNSS) positioning information using a first carrier phase distance, GNSS positioning information using a second carrier phase distance, and the relative location, the GNSS positioning information using the first carrier phase distance being received by a GNSS reception unit, the GNSS positioning information using the second carrier phase distance being received by the other mobile object.

(15)

A positioning method, including:
estimating, by a map location estimation unit, a self location in a local map on the basis of an output of a sensor that acquires surrounding information;
estimating, by a relative location estimation unit, from a location of another mobile object in the local map and the self location in the local map, a self relative location with respect to the other mobile object; and
estimating, by an absolute location estimation unit, a self absolute location on the basis of global navigation satellite system (GNSS) positioning information using a first carrier phase distance, GNSS positioning information using a second carrier phase distance, and the relative location, the GNSS positioning information using the first carrier phase distance being received by a GNSS reception unit, the GNSS positioning information using the second carrier phase distance being received by the other mobile object.

REFERENCE SIGNS LIST 200, 300, 400 positioning system
210 first mobile object
211 first image sensor
212 first GNSS reception unit
213 first communication unit
214 first information processing unit
220 second mobile object
221 second image sensor
222 second GNSS reception unit
223 second communication unit
224 information processing unit
231 first map location estimation unit
232 relative location estimation unit
233 initial absolute location estimation unit
234 absolute location estimation unit
235 map description unit
236 local map
241 second map location estimation unit
242 absolute location reception unit
260 server

The invention claimed is:

1. A mobile object, comprising:
   a sensor that acquires surrounding information;
   a map location estimation unit that estimates a self location in a local map on a basis of an output of the sensor;
   a relative location estimation unit that estimates, from a location of another mobile object in the local map and the self location in the local map, a self relative location with respect to the other mobile object;
   a GNSS reception unit that receives global navigation satellite system (GNSS) positioning information using a first carrier phase distance; and
   an absolute location estimation unit that estimates a self absolute location on a basis of the GNSS positioning information using the first carrier phase distance, GNSS positioning information using a second carrier phase distance, and the relative location, the GNSS positioning information using the second carrier phase distance being received by the other mobile object.

2. The mobile object according to claim 1, wherein
   the sensor is an image sensor capable of capturing an image, and
   the map location estimation unit extracts a feature point in a first captured image captured by the image sensor, and estimates the self location in the local map from a landmark included in the local map and a change of the feature point due to movement of the mobile object.

3. The mobile object according to claim 2, wherein
   the relative location estimation unit estimates the relative location from the self location in the local map, the self location being estimated by the map location estimation unit, and a location of the other mobile object in the local map, the location of the other mobile object being received from the other mobile object.

4. The mobile object according to claim 2, wherein
   the map location estimation unit receives a second captured image from the other mobile object, the second captured image being captured by an image sensor of the other mobile object, and further estimates a location of the other mobile object in the local map, and
   the relative location estimation unit estimates the relative location from the self location in the local map, the self location being estimated by the map location estimation unit, and the location of the other mobile object in the local map.

5. The mobile object according to claim 2, further comprising
   a map description unit that creates the landmark by using a time change of the feature point and the self location in the local map, the self location being estimated by the map location estimation unit.

6. The mobile object according to claim 4, wherein
   the first captured image and the second captured image are images captured at the same time.

7. The mobile object according to claim 1, further comprising
   an initial absolute location estimation unit that selects a potential location on a basis of solitary positioning, the potential location being calculated from the GNSS positioning information using the first carrier phase distance.

8. The mobile object according to claim 1, further comprising
   a communication unit that receives the GNSS positioning information using the second carrier phase distance, wherein
   the communication unit receives the GNSS positioning information using the second carrier phase distance from the other mobile object.

9. The mobile object according to claim 1, further comprising
   a communication unit that receives the GNSS positioning information using the second carrier phase distance, wherein
   the communication unit receives the GNSS positioning information using the second carrier phase distance from a server.

10. A positioning system, comprising:
    a first mobile object including
       a first sensor that acquires surrounding information,
       a first map location estimation unit that estimates a self location in a local map on a basis of an output of the first sensor,
       a relative location estimation unit that estimates, from a location of a second mobile object in the local map and the self location in the local map, a self relative location with respect to the second mobile object,
       a first GNSS reception unit that receives global navigation satellite system (GNSS) positioning information using a first carrier phase distance, and
       an absolute location estimation unit that estimates a self absolute location on a basis of the GNSS positioning information using the first carrier phase distance, GNSS positioning information using a second carrier phase distance, and the relative location, the GNSS positioning information using the second carrier phase distance being received by the second mobile object; and
    a second mobile object including
       a second sensor that acquires surrounding information, and
       a second GNSS reception unit that receives the GNSS positioning information using the second carrier phase distance.

11. The positioning system according to claim 10, wherein
    the first mobile object further includes a first communication unit that receives the GNSS positioning information using the second carrier phase distance, and
    the second mobile object further includes a second communication unit that transmits the GNSS positioning information using the second carrier phase distance to the first communication unit.

12. The positioning system according to claim 10, wherein
    the second mobile object further includes a second map location estimation unit that estimates the location of the second mobile object in the local map on a basis of an output of the second sensor.

13. A positioning system, comprising:
    a first mobile object including
       a first sensor that acquires surrounding information, and
       a first GNSS reception unit that receives global navigation satellite system (GNSS) positioning information using a first carrier phase distance;
    a second mobile object including
       a second sensor that acquires surrounding information, and
       a second GNSS reception unit that receives GNSS positioning information using a second carrier phase distance; and a server including
- a map location estimation unit that estimates a location of the first mobile object in a local map on a basis of an output of the first sensor and estimates a location of the second mobile object in the local map on a basis of an output of the second sensor,
- a relative location estimation unit that estimates, from the location of the first mobile object in the local map and the location of the second mobile object in the local map, a relative location of the first mobile object with respect to the second mobile object, and
- an absolute location estimation unit that estimates an absolute location of the first mobile object on a basis of the GNSS positioning information using the first carrier phase distance, the GNSS positioning information using the second carrier phase distance, and the relative location.

14. A positioning program that causes an information processing apparatus to function as:
- a map location estimation unit that estimates a self location in a local map on a basis of an output of a sensor that acquires surrounding information;
- a relative location estimation unit that estimates, from a location of another mobile object in the local map and the self location in the local map, a self relative location with respect to the other mobile object; and
- an absolute location estimation unit that estimates a self absolute location on a basis of global navigation satellite system (GNSS) positioning information using a first carrier phase distance, GNSS positioning information using a second carrier phase distance, and the relative location, the GNSS positioning information using the first carrier phase distance being received by a GNSS reception unit, the GNSS positioning information using the second carrier phase distance being received by the other mobile object.

15. A positioning method, comprising:
- estimating, by a map location estimation unit, a self location in a local map on a basis of an output of a sensor that acquires surrounding information;
- estimating, by a relative location estimation unit, from a location of another mobile object in the local map and the self location in the local map, a self relative location with respect to the other mobile object; and
- estimating, by an absolute location estimation unit, a self absolute location on a basis of global navigation satellite system (GNSS) positioning information using a first carrier phase distance, GNSS positioning information using a second carrier phase distance, and the relative location, the GNSS positioning information using the first carrier phase distance being received by a GNSS reception unit, the GNSS positioning information using the second carrier phase distance being received by the other mobile object.

* * * * *